United States Patent
Gil

(10) Patent No.: US 11,858,010 B2
(45) Date of Patent: *Jan. 2, 2024

(54) CONVEYOR BELT ASSEMBLY FOR IDENTIFYING AN ASSET SORT LOCATION AND METHODS OF UTILIZING THE SAME

(71) Applicant: United Parcel Service of America, Inc., Atlanta, GA (US)

(72) Inventor: Julio Gil, Veldhoven (NL)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/391,188

(22) Filed: Aug. 2, 2021

(65) Prior Publication Data
US 2022/0024700 A1    Jan. 27, 2022

Related U.S. Application Data

(63) Continuation of application No. 16/679,688, filed on Nov. 11, 2019, now Pat. No. 11,090,689, which is a
(Continued)

(51) Int. Cl.
*B07C 7/00*    (2006.01)
*B65G 15/30*    (2006.01)
(Continued)

(52) U.S. Cl.
CPC .............. *B07C 7/005* (2013.01); *B07C 3/08* (2013.01); *B07C 3/10* (2013.01); *B07C 3/14* (2013.01);
(Continued)

(58) Field of Classification Search
CPC .... B07C 3/08; B07C 3/10; B07C 3/14; B07C 3/18; B07C 7/005; B07C 2301/0008;
(Continued)

(56) References Cited

U.S. PATENT DOCUMENTS

| | | |
|---|---|---|
| 3,576,368 A | 4/1971 | Goetz et al. |
| 3,685,012 A | 8/1972 | Case et al. |

(Continued)

FOREIGN PATENT DOCUMENTS

| | | |
|---|---|---|
| EP | 0330184 A2 | 8/1989 |
| EP | 0647479 A2 | 4/1995 |

(Continued)

OTHER PUBLICATIONS

A Book of Beautiful Moments—Code Reader for Optical Identification Used to Create Photo Books, Pepperl+Fuchs North America, 4 pages.

(Continued)

*Primary Examiner* — Michael McCullough
*Assistant Examiner* — Kalyanavenkateshware Kumar
(74) *Attorney, Agent, or Firm* — Shook, Hardy & Bacon L.L.P.

(57) ABSTRACT

Provided are systems and methods for associating an asset with a sort location, the system comprising a conveyor belt assembly and a user device configured to be worn by a user. The conveyor belt assembly comprises: an acquisition device and a plurality of stripes defining a non-repeating pattern, the plurality of stripes comprising a plurality of unique sets of stripes. The acquisition device is configured to capture image data comprising asset identifier data and conveyor mechanism data, the conveyor mechanism data including one of the plurality of unique sets of stripes. The user device is configured to capture conveyor mechanism data including one of the plurality of unique sets of stripes; remotely receive asset identifier data associated with the user device captured conveyor mechanism data; and generate and display to the user, relative to the asset, at least one visual indicator of one or more sort instructions for the asset.

20 Claims, 18 Drawing Sheets

Related U.S. Application Data continuation of application No. 15/581,609, filed on Apr. 28, 2017, now Pat. No. 10,471,478.

(51) Int. Cl.

| | | |
|---|---|---|
| *B07C 3/08* | (2006.01) | |
| *B07C 3/18* | (2006.01) | |
| *B07C 3/14* | (2006.01) | |
| *B07C 3/10* | (2006.01) | |
| *G06F 1/16* | (2006.01) | |

(52) U.S. Cl.
CPC ............... *B07C 3/18* (2013.01); *B65G 15/30* (2013.01); *B07C 2301/0008* (2013.01); *B07C 2301/0016* (2013.01); *G06F 1/163* (2013.01); *G06F 1/1698* (2013.01)

(58) Field of Classification Search
CPC . B07C 2301/0016; B65G 15/30; G06F 1/163; G06F 1/1698
See application file for complete search history.

(56) References Cited

U.S. PATENT DOCUMENTS

| | | |
|---|---|---|
| 3,783,295 A | 1/1974 | Casler |
| 3,802,548 A | 4/1974 | Wentz et al. |
| 4,239,434 A | 12/1980 | Gannon |
| 4,254,433 A | 3/1981 | Dewar et al. |
| 4,268,165 A | 5/1981 | Bradmon |
| 4,348,097 A | 9/1982 | Sippel |
| 4,498,744 A | 2/1985 | Ealovega et al. |
| 4,515,455 A | 5/1985 | Northmore |
| 4,544,064 A | 10/1985 | Felder |
| 4,556,944 A | 12/1985 | Daniels et al. |
| 4,597,495 A | 7/1986 | Knosby |
| 4,615,446 A | 10/1986 | Pavie |
| 4,641,271 A | 2/1987 | Konishi et al. |
| 4,649,504 A | 3/1987 | Krouglicof et al. |
| 4,692,876 A | 9/1987 | Tenma et al. |
| 4,711,357 A | 12/1987 | Langenbeck et al. |
| 4,736,109 A | 4/1988 | Dvorzsak |
| 4,760,247 A | 7/1988 | Keane et al. |
| 4,776,464 A | 10/1988 | Miller et al. |
| 4,786,229 A | 11/1988 | Henderson |
| 4,788,596 A | 11/1988 | Kawakami et al. |
| 4,805,778 A | 2/1989 | Nambu |
| 4,832,204 A | 5/1989 | Handy et al. |
| 4,835,702 A | 5/1989 | Tanaka |
| 4,874,936 A | 10/1989 | Shah et al. |
| 4,877,949 A | 10/1989 | Danielson et al. |
| 4,896,029 A | 1/1990 | Shah et al. |
| 4,921,107 A | 5/1990 | Hofer |
| 4,992,649 A | 2/1991 | Mampe et al. |
| 5,003,300 A | 3/1991 | Wells |
| 5,065,237 A * | 11/1991 | Tsikos ................. B07C 1/02 348/91 |
| 5,095,204 A | 3/1992 | Novini |
| 5,101,983 A | 4/1992 | Scata |
| 5,115,121 A | 5/1992 | Bianco et al. |
| 5,128,528 A | 7/1992 | Heninger |
| 5,140,141 A | 8/1992 | Inagaki et al. |
| 5,141,097 A | 8/1992 | Oiry et al. |
| 5,165,520 A | 11/1992 | Herve et al. |
| 5,175,692 A | 12/1992 | Mazouz et al. |
| 5,185,822 A | 2/1993 | Miura |
| 5,190,162 A | 3/1993 | Hartlepp |
| 5,203,671 A | 4/1993 | Cawley et al. |
| 5,208,449 A | 5/1993 | Eastman et al. |
| 5,220,511 A | 6/1993 | Speckhart et al. |
| 5,245,172 A | 9/1993 | Esslinger et al. |
| 5,260,694 A | 11/1993 | Remahl |
| 5,263,118 A | 11/1993 | Cornelison |
| 5,281,957 A | 1/1994 | Schoolman |
| 5,297,924 A | 3/1994 | Neri et al. |
| 5,305,244 A | 4/1994 | Newman et al. |
| 5,308,960 A | 5/1994 | Mulligan et al. |
| 5,309,190 A | 5/1994 | Shinohara et al. |
| 5,311,999 A | 5/1994 | Malow et al. |
| 5,323,327 A | 6/1994 | Carmichael et al. |
| 5,327,171 A | 7/1994 | Esslinger et al. |
| 5,329,469 A | 7/1994 | Watanabe |
| 5,353,091 A | 10/1994 | Ishida et al. |
| 5,380,994 A | 1/1995 | Ray |
| 5,383,760 A | 1/1995 | Cawley et al. |
| 5,431,288 A | 7/1995 | Nishijima et al. |
| 5,450,596 A | 9/1995 | Felsenstein |
| 5,463,432 A | 10/1995 | Kahn |
| 5,472,097 A | 12/1995 | Villachica |
| 5,481,096 A | 1/1996 | Hippenmeyer et al. |
| 5,481,298 A | 1/1996 | Sasaki et al. |
| 5,485,263 A | 1/1996 | Bjorner et al. |
| 5,491,510 A | 2/1996 | Gove |
| 5,501,571 A | 3/1996 | Van et al. |
| 5,506,912 A | 4/1996 | Nagasaki et al. |
| 5,510,603 A | 4/1996 | Hess et al. |
| 5,515,447 A | 5/1996 | Lei et al. |
| 5,532,521 A | 7/1996 | Leininger |
| 5,566,245 A | 10/1996 | Zheng et al. |
| 5,567,927 A | 10/1996 | Kahn et al. |
| 5,607,187 A | 3/1997 | Salive et al. |
| 5,620,102 A | 4/1997 | Finch, Jr. |
| 5,642,442 A | 6/1997 | Morton et al. |
| 5,667,078 A | 9/1997 | Walach |
| 5,671,158 A | 9/1997 | Fournier et al. |
| 5,677,834 A | 10/1997 | Mooneyham |
| 5,682,030 A | 10/1997 | Kubon |
| 5,687,850 A | 11/1997 | Speckhart et al. |
| 5,695,071 A | 12/1997 | Ross et al. |
| 5,697,504 A | 12/1997 | Hiramatsu et al. |
| 5,699,440 A | 12/1997 | Carmeli |
| 5,725,253 A | 3/1998 | Salive et al. |
| 5,742,263 A | 4/1998 | Wang et al. |
| 5,770,841 A | 6/1998 | Moed et al. |
| 5,778,377 A | 7/1998 | Marlin et al. |
| 5,794,789 A | 8/1998 | Payson et al. |
| 5,812,257 A | 9/1998 | Teitel et al. |
| 5,844,601 A | 12/1998 | Mcpheely et al. |
| 5,844,824 A | 12/1998 | Newman et al. |
| 5,857,029 A | 1/1999 | Patel |
| 5,869,819 A | 2/1999 | Knowles et al. |
| 5,869,820 A | 2/1999 | Chen et al. |
| 5,877,962 A | 3/1999 | Radcliffe |
| 5,892,441 A | 4/1999 | Woolley et al. |
| 5,900,611 A | 5/1999 | Hecht |
| 5,908,283 A | 6/1999 | Huang et al. |
| 5,920,056 A | 7/1999 | Bonnet |
| 5,923,017 A | 7/1999 | Bjorner et al. |
| 5,933,479 A | 8/1999 | Michael et al. |
| 5,943,476 A | 8/1999 | Dougherty et al. |
| 5,959,611 A | 9/1999 | Smailagic et al. |
| 5,971,587 A | 10/1999 | Kato et al. |
| 6,046,712 A | 4/2000 | Beller et al. |
| 6,060,992 A | 5/2000 | Huang et al. |
| 6,061,644 A | 5/2000 | Leis |
| 6,064,354 A | 5/2000 | Deluca |
| 6,064,476 A | 5/2000 | Goltsos |
| 6,064,749 A | 5/2000 | Hirota et al. |
| 6,085,428 A | 7/2000 | Casby et al. |
| 6,094,509 A | 7/2000 | Lei et al. |
| 6,094,625 A | 7/2000 | Ralston |
| 6,114,824 A | 9/2000 | Watanabe |
| 6,122,410 A | 9/2000 | Lai et al. |
| 6,130,613 A | 10/2000 | Eberhardt et al. |
| 6,148,249 A | 11/2000 | Newman |
| 6,172,657 B1 | 1/2001 | Kamakura et al. |
| 6,189,784 B1 | 2/2001 | Williams et al. |
| 6,204,764 B1 | 3/2001 | Maloney |
| 6,236,735 B1 | 5/2001 | Bjorner et al. |
| 6,243,054 B1 | 6/2001 | Deluca |
| 6,243,620 B1 | 6/2001 | Robinson et al. |
| 6,244,015 B1 | 6/2001 | Ito et al. |
| 6,246,642 B1 | 6/2001 | Gardner et al. |
| 6,246,925 B1 | 6/2001 | Robinson et al. |

(56) References Cited

U.S. PATENT DOCUMENTS

| | | |
|---|---|---|
| 6,282,462 B1 | 8/2001 | Hopkins |
| 6,317,039 B1 | 11/2001 | Thomason |
| 6,330,356 B1 | 12/2001 | Sundareswaran et al. |
| 6,335,685 B1 | 1/2002 | Schrott et al. |
| 6,342,915 B1 | 1/2002 | Ozaki et al. |
| 6,352,349 B1 | 3/2002 | Braginsky et al. |
| 6,353,313 B1 | 3/2002 | Estep et al. |
| 6,370,446 B1 | 4/2002 | Divine |
| 6,377,401 B1 | 4/2002 | Bartlett |
| 6,411,266 B1 | 6/2002 | Maguire, Jr. |
| 6,417,969 B1 | 7/2002 | Deluca et al. |
| 6,437,823 B1 | 8/2002 | Zhang |
| 6,445,175 B1 | 9/2002 | Estep et al. |
| 6,480,108 B2 | 11/2002 | Mcdonald |
| 6,600,418 B2 | 7/2003 | Francis et al. |
| 6,661,335 B1 | 12/2003 | Seal |
| 6,701,304 B2 | 3/2004 | Leon |
| 6,714,121 B1 | 3/2004 | Moore |
| 6,741,178 B1 | 5/2004 | Tuttle |
| 6,786,404 B1 | 9/2004 | Bonner et al. |
| 6,801,833 B2 | 10/2004 | Pintsov et al. |
| 6,808,114 B1 | 10/2004 | Palestini et al. |
| 6,817,517 B2 | 11/2004 | Gunther |
| 6,878,896 B2 | 4/2005 | Braginsky et al. |
| 6,913,202 B2 | 7/2005 | Tsikos et al. |
| 6,998,985 B2 | 2/2006 | Reisman et al. |
| 7,044,387 B2 | 5/2006 | Becker et al. |
| 7,063,256 B2 | 6/2006 | Anderson et al. |
| 7,090,134 B2 | 8/2006 | Ramsager |
| 7,170,413 B1 | 1/2007 | Waterhouse et al. |
| 7,184,585 B2 | 2/2007 | Hamza et al. |
| 7,221,276 B2 | 5/2007 | Olsen et al. |
| 7,272,172 B2 | 9/2007 | Duvaut et al. |
| 7,397,376 B2 | 7/2008 | Jam et al. |
| 7,474,212 B2 | 1/2009 | Nakagawa et al. |
| 7,484,663 B2 | 2/2009 | Olsen et al. |
| 7,561,717 B2 | 7/2009 | Anderson |
| 7,810,536 B2 | 10/2010 | Bassi |
| 7,894,934 B2 | 2/2011 | Wallace et al. |
| 7,895,131 B2 | 2/2011 | Kraft |
| 8,018,336 B2 | 9/2011 | Huang et al. |
| 8,032,429 B2 | 10/2011 | Shafer |
| 8,095,304 B2 | 1/2012 | Blanton et al. |
| 8,234,996 B2 | 8/2012 | Smith |
| 8,269,629 B2 | 9/2012 | Lyon et al. |
| 8,401,146 B2 | 3/2013 | Vorhees |
| 8,571,298 B2 | 10/2013 | Mcqueen et al. |
| 8,815,031 B2 | 8/2014 | Olsen et al. |
| 9,084,076 B2 | 7/2015 | Breed et al. |
| 9,156,628 B2 | 10/2015 | Ragusa et al. |
| 9,367,770 B2 | 6/2016 | Footen |
| 9,429,754 B2 | 8/2016 | Robertson |
| 9,599,459 B1 | 3/2017 | Janicki |
| 2001/0032805 A1 | 10/2001 | Moon et al. |
| 2001/0033685 A1 | 10/2001 | Ishiyama |
| 2001/0042055 A1 | 11/2001 | Didriksen et al. |
| 2002/0063159 A1 | 5/2002 | Wilz et al. |
| 2002/0067267 A1 | 6/2002 | Kirkham |
| 2002/0072897 A1 | 6/2002 | Skonberg et al. |
| 2002/0075201 A1 | 6/2002 | Sauer et al. |
| 2002/0082498 A1 | 6/2002 | Wendt et al. |
| 2002/0105484 A1 | 8/2002 | Navab et al. |
| 2002/0113756 A1 | 8/2002 | Tuceryan et al. |
| 2003/0003777 A1 | 1/2003 | Lesesky et al. |
| 2003/0034392 A1 | 2/2003 | Grimm et al. |
| 2003/0043073 A1 | 3/2003 | Gray et al. |
| 2003/0060938 A1 | 3/2003 | Duvall |
| 2003/0083076 A1 | 5/2003 | Pradhan et al. |
| 2003/0106771 A1 | 6/2003 | Takizawa |
| 2003/0120522 A1 | 6/2003 | Uyeki |
| 2003/0190911 A1 | 10/2003 | Hirano |
| 2003/0204407 A1 | 10/2003 | Nabors et al. |
| 2003/0233165 A1 | 12/2003 | Hein et al. |
| 2004/0004119 A1 | 1/2004 | Baldassari et al. |
| 2004/0008113 A1 | 1/2004 | Pradhan et al. |
| 2004/0016684 A1 | 1/2004 | Braginsky et al. |
| 2004/0026300 A1 | 2/2004 | Kibbler et al. |
| 2004/0036595 A1 | 2/2004 | Kenny et al. |
| 2004/0055345 A1 | 3/2004 | Moore |
| 2004/0069850 A1 | 4/2004 | De Wilde |
| 2004/0069854 A1 | 4/2004 | Good et al. |
| 2004/0102896 A1 | 5/2004 | Thayer et al. |
| 2004/0148518 A1 | 7/2004 | Grundback et al. |
| 2004/0150387 A1 | 8/2004 | Lyon et al. |
| 2004/0153539 A1 | 8/2004 | Lyon et al. |
| 2004/0178269 A1 | 9/2004 | Pradhan et al. |
| 2004/0178270 A1 | 9/2004 | Pradhan et al. |
| 2004/0201857 A1 | 10/2004 | Foxlin |
| 2005/0046608 A1 | 3/2005 | Schantz et al. |
| 2005/0119786 A1 | 6/2005 | Kadaba |
| 2005/0149226 A1 | 7/2005 | Stevens et al. |
| 2005/0179547 A1 | 8/2005 | Maloney |
| 2005/0209947 A1 | 9/2005 | Shafer |
| 2005/0258961 A1 | 11/2005 | Kimball et al. |
| 2009/0085745 A1 | 4/2009 | Gupta et al. |
| 2009/0160646 A1 | 6/2009 | Mackenzie et al. |
| 2009/0195384 A1 | 8/2009 | Amidi |
| 2009/0319401 A1 | 12/2009 | Rao et al. |
| 2010/0080603 A1 | 4/2010 | Takahashi |
| 2010/0097208 A1 | 4/2010 | Rosing et al. |
| 2010/0329657 A1 | 12/2010 | Hosoi et al. |
| 2011/0148625 A1 | 6/2011 | Velusamy |
| 2011/0227722 A1 | 9/2011 | Salvat, Jr. |
| 2012/0133920 A1* | 5/2012 | Skunes ............... G01P 3/40 356/23 |
| 2012/0160911 A1 | 6/2012 | Smith et al. |
| 2013/0048722 A1 | 2/2013 | Davis et al. |
| 2013/0063251 A1 | 3/2013 | Allen |
| 2013/0135689 A1 | 5/2013 | Shacham et al. |
| 2013/0144429 A1 | 6/2013 | Ragusa et al. |
| 2014/0036135 A1 | 2/2014 | Gehring et al. |
| 2014/0305850 A1 | 10/2014 | Serjeantson et al. |
| 2015/0226832 A1 | 8/2015 | Fujiwara |
| 2015/0262348 A1 | 9/2015 | Salzman et al. |
| 2015/0360877 A1 | 12/2015 | Shin |
| 2016/0370452 A1 | 12/2016 | Loverich et al. |
| 2016/0371638 A1 | 12/2016 | Loverich et al. |
| 2016/0371646 A1 | 12/2016 | Loverich et al. |
| 2016/0371647 A1 | 12/2016 | Loverich et al. |
| 2017/0108577 A1 | 4/2017 | Loverich et al. |
| 2018/0311704 A1 | 11/2018 | Gil |
| 2020/0122200 A1 | 4/2020 | Gil |

FOREIGN PATENT DOCUMENTS

| | | |
|---|---|---|
| EP | 0928641 A1 | 7/1999 |
| EP | 1128315 A1 | 8/2001 |
| EP | 1182154 A1 | 2/2002 |
| FR | 2676941 A1 | 12/1992 |
| JP | 564870 A | 1/1981 |
| JP | H01214504 A | 8/1989 |
| WO | 9832545 A1 | 7/1998 |
| WO | 0037958 A2 | 6/2000 |
| WO | 0052563 A1 | 9/2000 |
| WO | 0059648 A2 | 10/2000 |
| WO | 0059649 A1 | 10/2000 |
| WO | 0138049 A1 | 5/2001 |
| WO | 0151895 A1 | 7/2001 |
| WO | 02083507 A2 | 10/2002 |
| WO | 03050626 A1 | 6/2003 |
| WO | 2004009257 A1 | 1/2004 |

OTHER PUBLICATIONS

A Scanner for Any Situation—VB14N Barcode Scanners in Logistics Company Warehouses, Pepperl+Fuchs North America, Jan. 27, 2017, 4 pages.
A Truly Global Tracking System with True Security, All Set Wireless Tracking, Feb. 2004, 1 page.
About Hi-G-Tek, Hi-G-Tek, Feb. 17, 2004, pp. 1-2.
All Set System Installed Onboard RoRo Ship, All Set Wireless Tracking, May 26, 2003, 1 page.

(56) References Cited

OTHER PUBLICATIONS

All Set Tracking Launches a New Revolutionary Electronic Seal, All Set Marine Security, Sep. 17, 200202, 1 page.
Cargo Container With Smart Systems Alerts Global Network in Real-Time About Security Breaches and In-the-Box Changes, Savi Technology, Oct. 29, 2003, pp. 1-4.
CIMC and All Set in "Smart and Secure Container" Alliance, All Set Wireless Tracking, Apr. 4, 2004, pp. 1-2.
DHL Global Technology Conference 2015, Breakout Session: Augmented Reality in Logistics, Apr. 16, 2015, 31 pages.
Elementary Solutions for a Moving World, All Set Wireless Tracking, 2003, 1 page.
Freight Containers—Radio-Frequency Communication Protocol for Electronic Seal, ISO Document, Sep. 27, 2003, 23 pages.
General Loop Security Seals, CGM Security Solutions, Inc., Feb. 17, 2004, pp. 1-4.
HI-G-TEK Diamond are Forever, Hi-G-Tek, Feb. 17, 2004, 1 page.
HP: Sensor Networks Next Step for RFID, Internet News, Oct. 26, 2004, pp. 1-4.
Keep Track of Your Containers, All Set Wireless Tracking, All Set Wireless Tracking, Feb. 17, 2004, pp. 1-3.
Measuring Planar Objects with a Calibrated Camera, MathWorks, Feb. 24, 2016, pp. 1-10.
Moverio BT-300 Smart Glasses (AR/Developer Edition), Epson America, Inc., Aug. 11, 2017, pp. 1-5.
Moverio Pro BT-2000 Smart Headset, Epson America, Inc., Aug. 11, 2017, pp. 1-4.
Our Business, Welcome to Elogicity, 2000, 1 page.
Our Products, CGM Security Solutions, Available Online at <http//www.cgmsecuritysolution.com/sw/swchannel/productcalalogofv2/internet!Product>, Feb. 2004, pp. 1-4.
Parcel Position Scanning and Sorting System, IBM technical Disclosure Bulletin, vol. 15, No. 4, Sep. 1972, pp. 1170-1171.
R-7 Smartglasses System, Osterhout Design Group, ODG Online Store, 2017, pp. 1-2.
Savi Solutions, Savi Technology, Securing the Smart Supply Chain, Feb. 17, 2004, 1 page.
Savi Technology Launches SmartSeal™ Cargo Security System, Savi Technology, Securing the Smart Supply Chain, Oct. 3, 2001, pp. 1-2.
Search Savi, Savi Technology, Securing the Smart Supply Chain, Feb. 17, 2004, pp. 1-2.
Secured Cargo, Hi-G-Tek, Feb. 17, 2004, pp. 1-4.
Solutions, Elogicity, Welcome to Elogicity, 2000, 1 page.
The Leader in Mixed Reality Technology, Microsoft HoloLens, Aug. 11, 2017, 5 pages.
The Process Simulation using by Virtual Reality, 24th DAAAM International Symposium on Intelligent Manufacturing and Automation, vol. 69, No. 2014, Oct. 23-26, 2013, pp. 1015-1020.
UPS Suite of New Technology Promises Better Customer Service, UPS Pressroom, Sep. 23, 2003, pp. 1-3.
UPS Unveils State-Of-The-Art Package Hub in Maple Grove, Minnesota, UPS Pressroom, Nov. 12, 2002, pp. 1-2.
Verbex Speech Commander™ Portable . . . , Continuous Speech Recognizer for Mobile Computing, pp. 1-3.
Warehouse Operations Committee, IARW, Jul. 27, 2003, 50 pages.
We Make Electronic Sealing Easy and Economical, All Set Wireless Tracking, 2003, 2 pages.
Winner International Royalty Corporation vs. Ching-Rong Wang, Defendant, 202 F.3d 1340, United States Court of Appeals, Jan. 27, 2000, 12 pages.
Booton, Jennifer'., "Saving Millions by Donning Smart Glasses at Work", FOXBusiness, Aug. 1, 2013, 4 pages.
Hickey, Kathleen, "Insecurity Over E-Seals", trafficWORLD, Maritime, Jan. 19, 2004, p. 34.
Jaeyong et al., "Postrack: A Low Cost Real-Time Motion Tracing System for VR Application", VSMM'01, IEEE Computer Society, 2001, pp. 383-392.
KNAPP AG,"KNAPP AG—KiSoft Vision", Available Online at <https://www.youtube.com/watch?v=BWY8uFiteiM> Dec. 7, 2011.
Kuchinskas, Susan, "Radio Frequency Identification (RFID) White Paper", Accenture, Available Online at <http://www.accenture.com/xdoc/en/services/technology/vision/RFIDWhitePaperNov01.pdf>, Nov. 16, 2001, 46 pages.
Matus, Morgana, "IKEA's Augmented Reality 2014 Catalog Lets You Preview Products in Your Apartment", Inhabitat, Aug. 11, 2013, 8 pages.
SAPEnterpriseMobile,"SAP & Vuzix Bring you Augmented Reality Solutions for the Enterprise", YouTube, May 12, 2013, pp. 1-2.
SAPEnterpriseMobile,"SAP & Vuzix Bring you Augmented Reality Solutions for the Enterprise", YouTube, May 28, 2013, pp. 1-2.
SAPEnterpriseMobile,"SAP Mobile and Vuzix Showcase Augmented Reality Solutions for the Enterprise", YouTube, May 28, 2013, pp. 1-2.
Scott, Smith, "U.S. Treasury Advisory Committee on Commercial Operations of the United States Customs Service (COAC) Subcommittee on US Border Security Technical Advisory Group & Customs Trade Partnership Against U.S. Treasury Advisory Committee on Commercial Operation", Subcommittee on US Border Security Technical Advisory Group & Customs Trade Partnership Against Terrorism (CTPAT), Report on Seal Technologies, vol. 7, Jun. 14, 2002, 36 pages.
Yamada, Yasuo, "Optical Information Reader", Abstracts published by the European Patent Office on Aug. 9, 1996, 1 page.

\* cited by examiner

CONVEYOR BELT ASSEMBLY FOR IDENTIFYING AN ASSET SORT LOCATION AND METHODS OF UTILIZING THE SAME

CROSS-REFERENCE TO RELATED APPLICATIONS

This application is a continuation of U.S. application Ser. No. 16/679,688 filed Nov. 11, 2019, which is a continuation of U.S. patent application Ser. No. 15/581,609, filed Apr. 28, 2017, the contents both of which are hereby incorporated by reference herein in their entireties.

BACKGROUND

Considerable attention has been directed toward automated handling of packages being transported by common carriers through transportation networks. Yet automated handling is a complex problem with many parts, such that no single system or method alone appears to provide a comprehensive solution for all conditions. Instead, for accurate and efficient automated handling to occur, it appears as though a combination of many different and many improved techniques and assemblies are required. Thus, simplicity and cost become important considerations.

A primary component in many systems and methods for automated handling of packages is a conveyance device (i.e., conveyor belt), which are generally formed and/or extended around at least two driving wheels. Thus, by turning the driving wheels, the conveyor belt may be run endlessly. Conveyor belts may also generally be flexible and deformable at least while running in contact with the driving wheels, and a multitude of materials, linkages, and so forth have been used to achieve these goals.

Where automated handling of packages has been implemented in connection with conveyor belts and otherwise, certain inefficiencies may arise. For example, where packages may be improperly or too closely placed relative to one another on the conveyor belt, congestion may arise, impacting various measurements or the like that need to be performed on the packages while on the conveyor belt. Still further, where the materials in which packages are wrapped (e.g., foil or paper or the like) differ in color or other material characteristics, inaccuracies may also arise in any measurements, imaging, or observations made in an automated fashion relative to the packages.

Thus, a need exists for an improved conveyor belt assembly and associated methods of using and operating the same that facilitate more efficient, effective, and accurate automated handling of packages.

In conjunction with the above-detailed desirable automated handling of packages via an improved conveyor belt assembly, it is also important for common carriers to maintain accurate information regarding the location of various assets shipped from a variety of origins to a variety of destinations. The various assets often undergo multiple sort procedures via conveyor belts and the like, and are moved from one transportation vehicle to another as each asset moves closer to its intended destination.

Sort procedures often require many employees of common carriers to sort assets arriving in several vehicles, and these assets may be placed in several locations corresponding to their next stop before reaching an intended destination. The employees may receive some indication of the proper sort location for each asset, such as text printed on each asset or instructions scrolling across a video screen. The employee may then place the asset in the proper sort location after receiving the indication of the proper sort location. In various circumstances, the employee may manually identify the location at which the asset is placed, and thereby maintain a record of the location of the asset throughout the shipping process.

However, historical concepts for identifying the location of an asset have been cumbersome, requiring sort employees to individually identify the sort location for each of a plurality of assets being sorted. For example, a sort employee may be required to scan indicia on each asset (e.g., a bar code) and subsequently scan a similar indicia on the sort location in order to associate the asset with the sort location. Alternatively, the sort employee may be required to first scan indicia on a sort location, and then scan a similar indicia on each of one or more assets to be associated with the single sort location. Regardless of the scan order (e.g., asset first or sort location first), the sort employee is required to scan a new sort location indicia each time an asset is to be sorted to a second sort location. Requiring employees to scan multiple indicia significantly reduces sorting efficiency and increases the possibility of employee error. Should an employee fail to scan the proper sort location indicia before placing an asset at a sort location, the asset location may be improperly stored, and such asset may be transported to an incorrect destination. Such events may additionally result in improper reporting from data storage devices.

Thus, a need exists for an improved system and method for maintaining accurate records of the location of an asset in a sort process while also providing improved automated handling of the packages from a conveyor belt to a sort location and more efficient, effective, and accurate automated guidance of actions taken by sort employees relative to the packages.

BRIEF SUMMARY

According to various embodiments described herein, there is provided a system for associating an asset traveling along a conveying mechanism with a sort location, the system comprising a conveyor belt assembly and a user device configured to be worn by a user. The conveyor belt assembly comprises: a conveyor mechanism having a primary axis oriented in a direction of travel of the conveyor mechanism and defining a path of movement of one or more assets placed upon the conveyor mechanism; and an acquisition device located within an acquisition zone located along the path of movement, wherein: the conveyor mechanism comprises a plurality of stripes defining a visible surface of the conveyor mechanism and providing thereon a non-repeating pattern, the plurality of stripes comprising a plurality of unique sets of stripes further defining the non-repeating pattern; and the acquisition device is configured to capture image data of an asset traveling along the path of movement, the image data captured comprising asset identifier data and conveyor mechanism data, the conveyor mechanism data including one of the plurality of unique sets of stripes defining the non-repeating pattern of stripes defining the visible surface of the conveyor mechanism, the asset identifier data and the conveyor mechanism data being associated relative to one another and the associated asset. The user device comprises: a user device memory; and one or more user device computer processors configured to: adjacent the conveyor mechanism, capture conveyor mechanism data including one of the plurality of unique sets of stripes defining the non-repeating pattern of stripes defining the visible surface of the conveyor mechanism; remotely receive asset identifier data associated with the user device captured conveyor mechanism data; and generate and display to the user, relative to the asset, at least one visual indicator of one or more sort instructions for the asset based upon the remotely received asset identifier data.

According to various embodiments described herein, there is also provided a computer implemented method for associating an asset traveling along a conveying mechanism with a sort location. The method comprises the steps of continuously operating a conveyor belt assembly, capturing, via the acquisition device, image data of an asset traveling along the path of movement, the image data captured comprising asset identifier data and conveyor mechanism data, the conveyor mechanism data including one of the plurality of unique sets of stripes defining the non-repeating pattern of stripes defining the visible surface of the conveyor mechanism, the asset identifier data and the conveyor mechanism data being associated relative to one another and the associated asset; capturing, via a user device configured to be worn by a user and when the user device is adjacent the conveyor mechanism, conveyor mechanism data including one of the plurality of unique sets of stripes defining the non-repeating pattern of stripes defining the visible surface of the conveyor mechanism; remotely receiving, at the user device, asset identifier data associated with the user device captured conveyor mechanism data; and generating and displaying to the user and on the user device, relative to the asset, at least one visual indicator of one or more sort instructions for the asset based upon the remotely received asset identifier data. The conveyor belt assembly comprises: a conveyor mechanism having a primary axis oriented in a direction of travel of the conveyor mechanism and defining a path of movement of one or more assets placed upon the conveyor mechanism; and an acquisition device located within an acquisition zone located along the path of movement, wherein the conveyor mechanism comprises a plurality of stripes defining a visible surface of the conveyor mechanism and providing thereon a non-repeating pattern, the plurality of stripes comprising a plurality of unique sets of stripes further defining the non-repeating pattern;

According to various embodiments described herein, there is also provided a computer program product for associating an asset traveling along a conveying mechanism with a sort location, the computer program product comprising at least one non-transitory computer-readable storage medium having computer-readable program code portions stored therein, the computer-readable program code portions comprising one or more executable portions configured for: capturing, via an acquisition device within an acquisition zone, image data of an asset traveling along a path of movement on a conveyor mechanism, the image data captured comprising asset identifier data and conveyor mechanism data, the conveyor mechanism data including one of a plurality of unique sets of stripes defining a non-repeating pattern of stripes defining a visible surface of the conveyor mechanism, the asset identifier data and the conveyor mechanism data being associated relative to one another and the associated asset; capturing, via a user device configured to be worn by a user and when the user device is adjacent the conveyor mechanism, conveyor mechanism data including one of the plurality of unique sets of stripes defining the non-repeating pattern of stripes defining the visible surface of the conveyor mechanism; remotely receiving, at the user device, asset identifier data associated with the user device captured conveyor mechanism data; and generating and displaying to the user and on the user device, relative to the asset, at least one visual indicator of one or more sort instructions for the asset based upon the remotely received asset identifier data.

BRIEF DESCRIPTION OF THE SEVERAL VIEWS OF THE DRAWING(S)

FIG. 1 schematically depicts a control system according to one or more embodiments shown and described herein;

FIG. 2 schematically depicts the control system shown in FIG. 1 according to one or more embodiments shown and described herein;

FIG. 3 schematically depicts a user device that communicates with the control system of FIG. 1 according to one or more embodiments shown and described herein;

FIG. 4 schematically depicts the user device of FIG. 3 according to one or more embodiments shown and described herein;

FIG. 5 schematically depicts a display in communication with the control system of FIG. 1 according to one or more embodiments shown and described herein;

FIG. 6A schematically depicts a work zone of FIG. 5 captured by an acquisition device according to one or more embodiments shown and described herein;

FIG. 6B schematically depicts an image of the work zone of FIG. 6A viewed on the display according to one or more embodiments shown and described herein;

FIG. 7A schematically depicts the work zone of FIG. 5 captured by an acquisition device according to one or more embodiments shown and described herein;

FIG. 7B schematically depicts an image of the work zone of FIG. 7A viewed on the display according to one or more embodiments shown and described herein;

FIG. 8 schematically depicts a facility which assets are sorted according to one or more embodiments shown and described herein;

FIG. 9 schematically depicts a sort location of the facility of FIG. 8 according to one or more embodiments shown and described herein;

FIG. 10 is a perspective or isometric view of an improved conveyor belt assembly according to one or more embodiments shown and described herein;

FIG. 11 schematically depicts a flowchart illustrating operations and processes performed by the acquisition device of the improved conveyor belt assembly of FIG. 10 according to one or more embodiments shown and described herein;

FIG. 12 schematically depicts a flowchart illustrating operations and processes performed by the user device of FIG. 3 according to one or more embodiments shown and described herein;

FIG. 13 schematically depicts a flowchart illustrating operations and processes performed by the location device of FIG. 1 according to one or more embodiments shown and described herein;

FIG. 14 schematically depicts a flowchart illustrating operations and processes performed by the control system of FIG. 1 according to one or more embodiments shown and described herein;

DETAILED DESCRIPTION OF VARIOUS EMBODIMENTS

Figure 1:
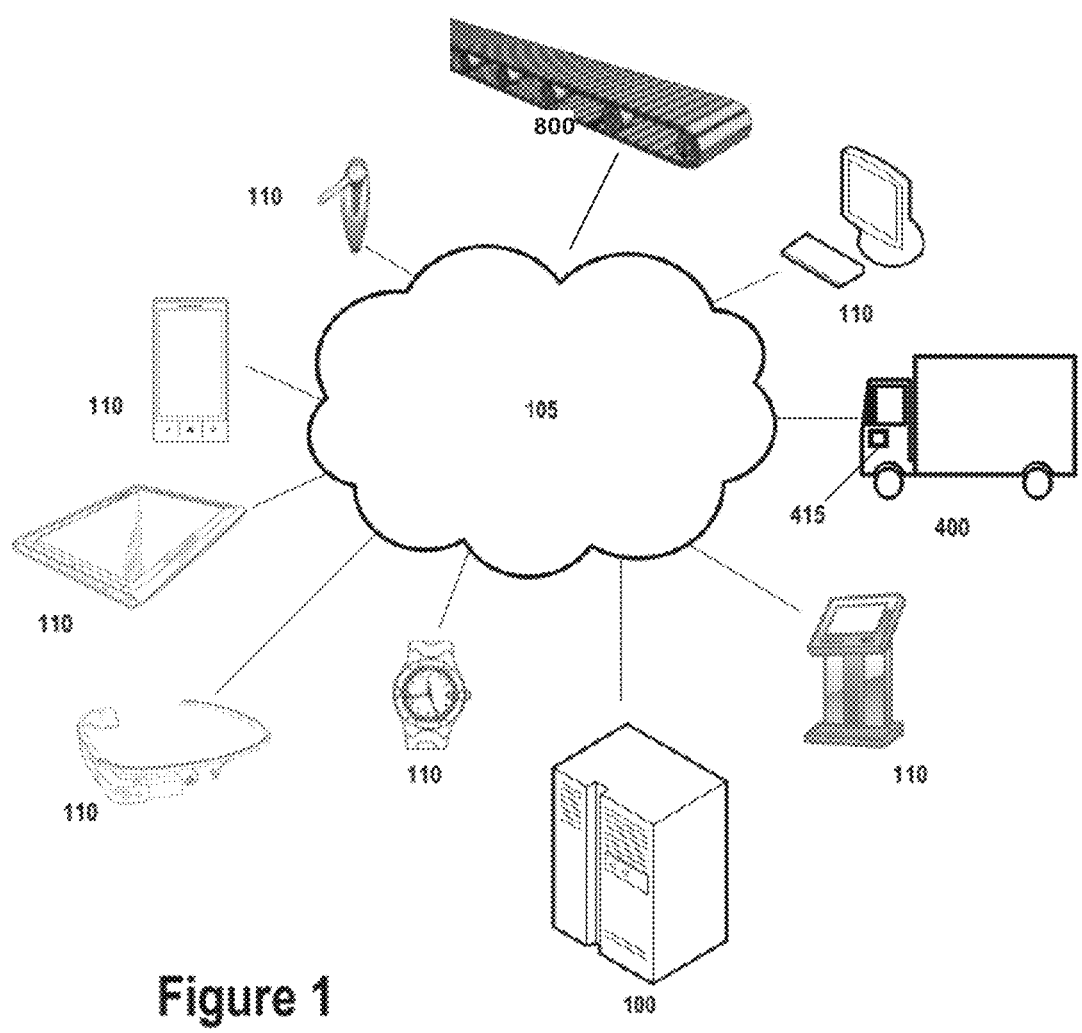

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

I. OVERVIEW OF AN EXEMPLARY EMBODIMENT

Various embodiments of the present invention are directed to systems and methods for utilizing an improved conveyor belt assembly, associated user device(s), and a generated augmented reality environment to associate and direct an asset to a particular sort location. As used herein, an asset may be a parcel or group of parcels, a package or group of packages, a box, a crate, a drum, a box strapped to a pallet, and/or the like. According to standard practices, packages to be sorted are moved along a conveyor belt from some package source to an intake location (e.g., one or more sort employee workstations). A user (e.g., a sort employee) scans a bar code on the package, or simply reviews information printed on the package, and moves that package to an appropriate sort location (e.g., a vehicle, a shelf, and/or the like) based on the information provided on the package or via the barcode scanner. As described herein, embodiments utilizing an improved conveyor belt assembly rely upon an acquisition device (e.g., a stationary imager) positioned above the conveyor, upstream of the intake location or sort employee workstations to capture data associated with the package. The conveyor belt itself also incorporates a non-repeating pattern of colored, optionally transverse, stripes along its length, such that each package is positioned atop a plurality of uniquely patterned stripes. In this manner, as the conveyor moves packages under the acquisition device, scanned or otherwise captured data for respective packages is associated with the correspondingly unique pattern of stripes atop which each respective package is located.

At the one or more sort employee workstations, the sort employees utilize one or more user devices, which may be augmented reality scanners (e.g., glasses), configured to constantly monitor the non-repeating and unique pattern of stripes of the conveyor belt as it moves and transports packages toward the intake locations and the sort employees. Once the augmented reality scanners (e.g., glasses) recognize a portion of the pattern that is associated with a particular package, the glasses generate and display at least one sort instruction within the line of sight of the sort employee, also proximate the package in question. Because the striped pattern on the conveyor belt is significantly larger than printed indicia (e.g., barcodes) on the packages themselves, the glasses are able to recognize distinctive differences between respectively unique portions of the stripes upon the conveyor belt, and thereby recognize various packages (and their sorting instructions) without having to separately scan each package, whether automatically or by each individual sort employee. In at least one embodiment, the glasses may generate and display navigational instructions over one or more of the properly associated packages so as to guide the sort employee to packages assigned to them. The glasses are also configured to constantly self-determine their own location relative to the improved conveyor, so as to in identifying the pattern thereon, also account for differences in perspective that may alter the appearance of the striped pattern relative to the scanners.

Once a sort employee picks up a package and begins moving the package toward a sort location, the control system (e.g., an augmented reality system) facilitates identification of and movement to the appropriate sort location for the package. To facilitate efficient and accurate identification of the sort location, each sort location may, in certain embodiments, have a corresponding marker (e.g., a bar code, QR code, symbol, etc.) that may be identified by the augmented reality scanner (e.g., glasses). In this manner, the glasses may identify each marker, determine whether the marker corresponds to the correct sort location for the package, and determine the location of the proper sort location relative to the identified marker. In at least one embodiment, the glasses may generate and display navigational instructions over one or more of the identified markers to guide the sort employee (once holding an assigned package) to the proper sort location. For example, the glasses may overlay arrows over each identified marker pointing toward the proper sort location (based on known relative locations of each marker to the known proper sort location), and/or an emphasizing symbol to indicate the location of the proper sort location.

In other embodiments, the glasses may generate and display navigational instructions without overlay thereof relative to any markers (or the like); in these instances, the glasses may utilize software that uses the markers to calculate or otherwise determine/generate a three-dimensional space surrounding the glasses and via that generated space and/or environment, place the guiding signs or navigational instructions anywhere suitable within the space/environment. Three-dimensional mapping and identification of discrete points within the mapped space and/or environment may be utilized to provide requisite and/or desired granularity of discrete points for placement of the guiding signs or navigational instructions.

II. COMPUTER PROGRAM PRODUCTS, METHODS, AND COMPUTING ENTITIES

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MNIC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMNI), dual in-line memory module (DIMM), single in-line memory module (SINN), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

Generally, embodiments of the present invention relate to concepts for utilizing an improved conveyor belt assembly, associated user device(s), and an augmented reality environment to automatically associate and direct an asset/package to a particular sort location. FIG. 1 is a schematic diagram showing the exemplary communication relationships between components of various embodiments of the present invention. As shown in FIG. 1, the system may include one or more control systems 100, one or more user devices 110, one or more location devices 415 associated with a sort location 400, one or more improved conveyor belt assemblies 800, and one or more networks 105. Each of the components of the system may be in electronic communication with one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates certain system entities as separate, standalone entities, the various embodiments are not limited to this particular architecture.

A. Exemplary Control System

Figure 2:
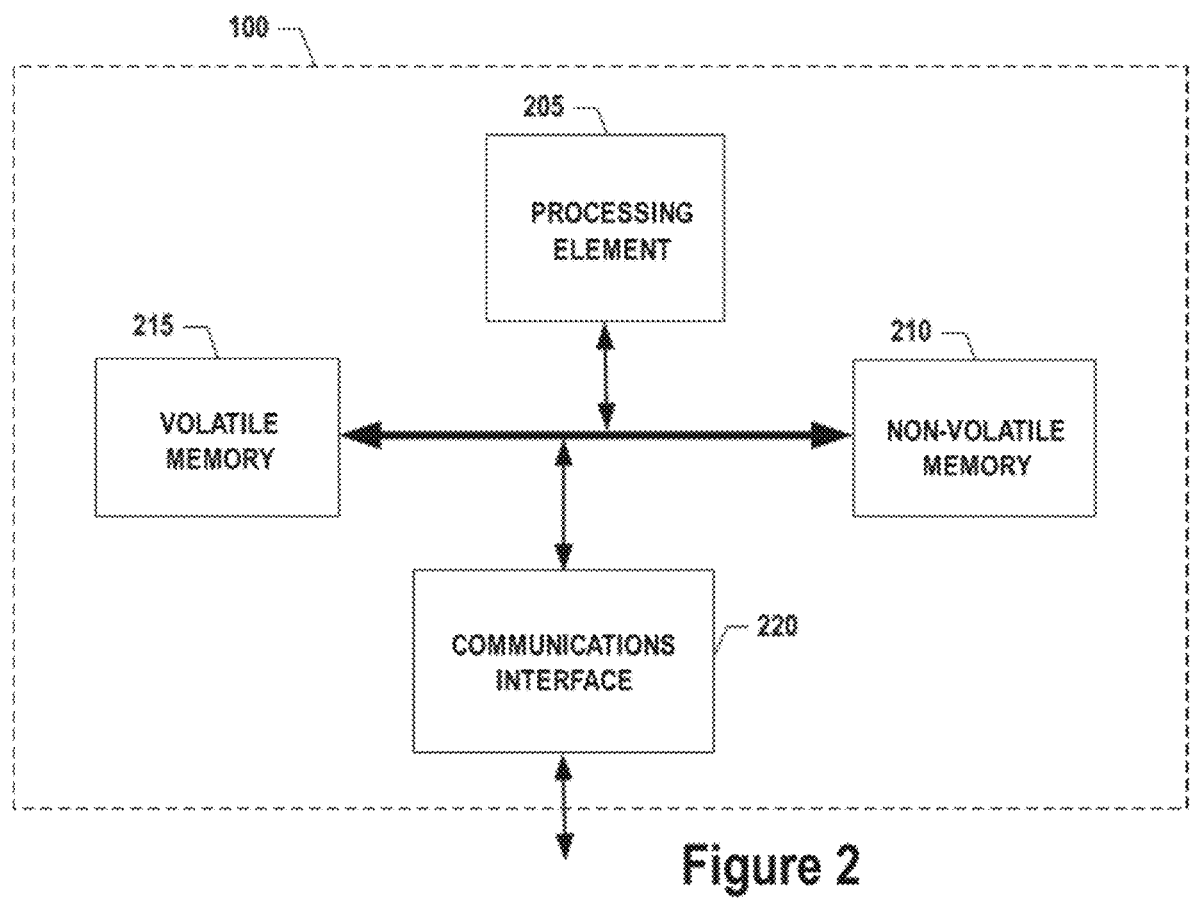
Figure 5:
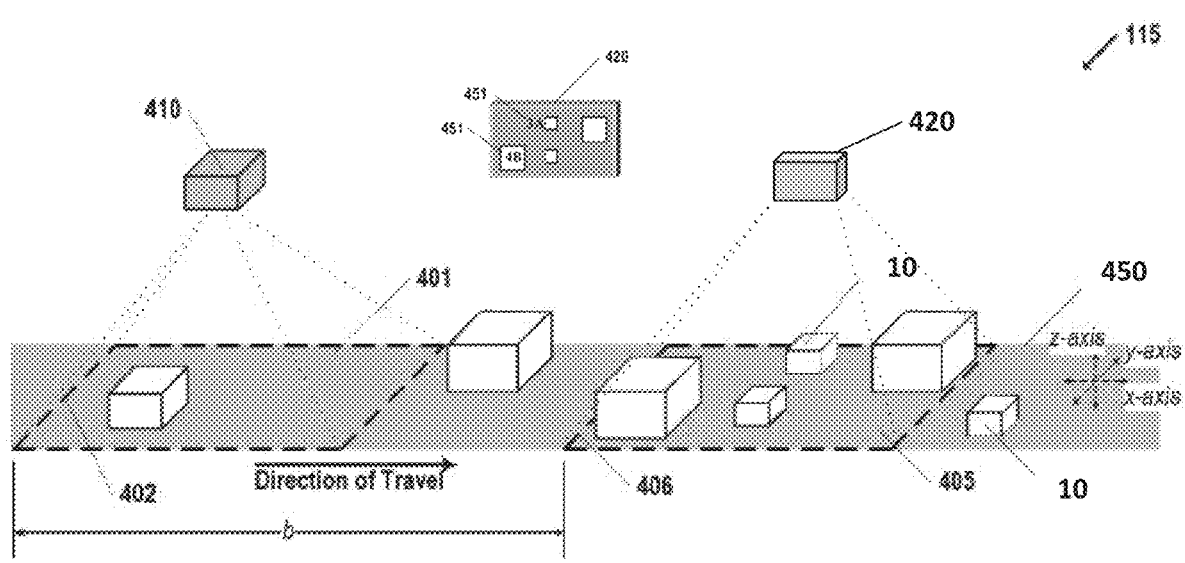

FIG. 2 provides a schematic of a control system 100 according to one embodiment of the present invention. As described above, the control system 100 may be incorporated into a system as one or more components for providing information regarding the appropriate sort location for each of one or more assets 10 (FIG. 5). In general, the terms computing entity, computer, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. The control system 100 may also comprise various other systems, such as an Address Matching System (AMS), an Internet Membership System (IMS), a Customer Profile System (CPS), a Package Center Information System (PCIS), a Customized Pickup and Delivery System (CPAD), a Web Content Management System (WCMS), a Notification Email System (NES), a Fraud Prevention System (FPS), and a variety of other systems and their corresponding components.

As indicated, in one embodiment, the control system 100 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the control system 100 may include or be in communication with one or more processing elements 205 (also referred to as processors, processing circuitry, and/or similar terms used herein interchangeably) that communicate with other elements within the control system 100 via a bus, for example. As will be understood, the processing element 205 may be embodied in a number of different ways. For example, the processing element 205 may be embodied as one or more complex programmable logic devices (CPLDs), microprocessors, multi-core processors, co-processing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the control system 100 may further include or be in communication with non-volatile media (also referred to as non-volatile storage, memory, memory storage, memory circuitry and/or similar terms used herein interchangeably). In one embodiment, the nonvolatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. Such code may include an operating system, an acquisition module, a sort location module, a matching module, and a notification module. The terms database, database instance, database management system, and/or similar terms used herein interchangeably may refer to a structured collection of records or data that is stored in a computer-readable storage medium, such as via a relational database, hierarchical database, and/or network database.

In one embodiment, the control system 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the control system 100 with the assistance of the processing element 205 and operating system.

As indicated, in one embodiment, the control system 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the control system 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra-wideband (UWB), infrared (IR) protocols, near field communication (NFC) protocols, Bluetooth' protocols (e.g., Bluetooth™ Smart), wireless universal serial bus (USB) protocols, and/or any other wireless protocol.

The control system 100 may include or be in communication with one or more input elements, such as a keyboard input, a mouse input, a touch screen/display input, motion input, movement input, audio input, pointing device input, joystick input, keypad input, and/or the like. The control system 100 may also include or be in communication with one or more output elements (not shown), such as audio output, video output, screen/display output, motion output, movement output, and/or the like.

As will be appreciated, one or more of the control system's 100 components may be located remotely from other control system 100 components, such as in a distributed system. Furthermore, one or more of the components may be combined and additional components performing functions described herein may be included in the control system 100. Thus, the control system 100 can be adapted to accommodate a variety of needs and circumstances. As will be recognized, these architectures and descriptions are provided for exemplary purposes only and are not limiting to the various embodiments. Additional details in this respect may be understood from U.S. Ser. No. 15/390,109, the contents of which as are incorporated herein by reference in their entirety.

B. Exemplary User Device

Figure 3:
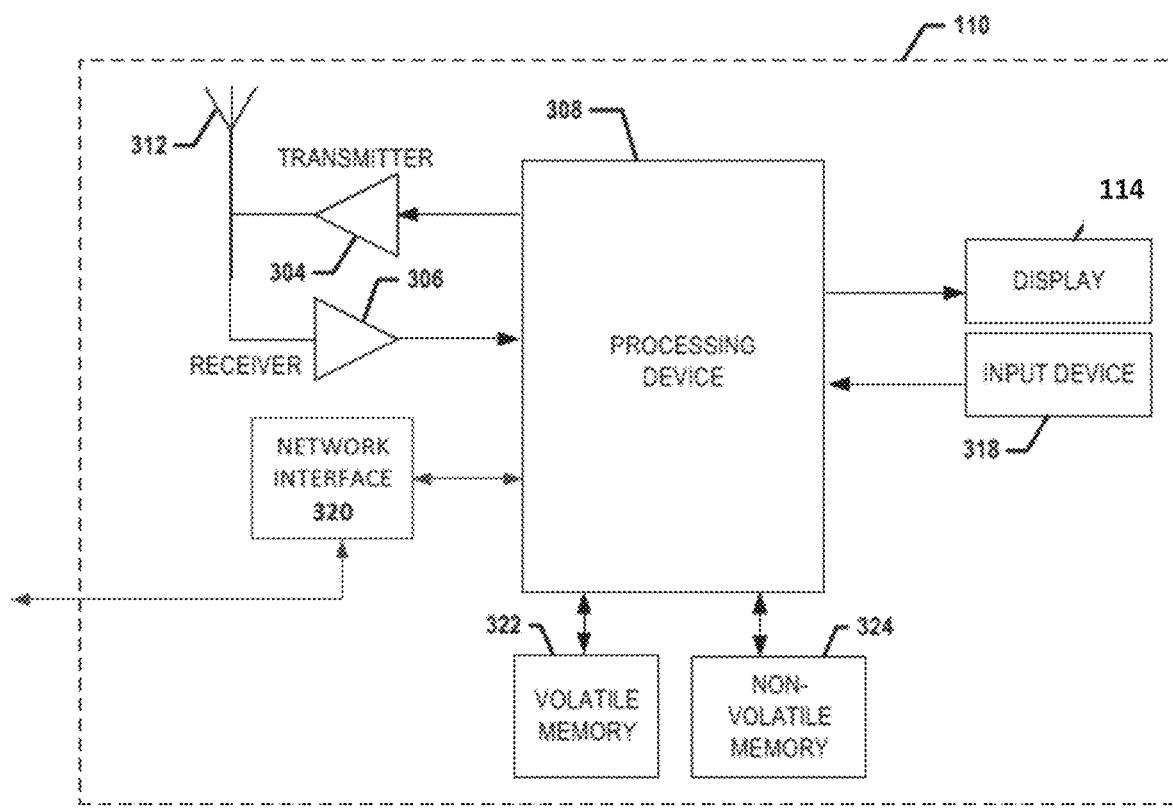

FIG. 3 depicts a user device 110 that a user 5 (FIG. 8) may operate. As used herein, a user 5 (FIG. 8) may be an individual (e.g., sort personnel), group of individuals, and/or the like. In various embodiments, a user 5 may operate the user device 110, which may include one or more components that are functionally similar to those of the control system 100. In one embodiment, the user device 110 may be one or more mobile phones, tablets, watches, glasses (e.g., Google Glass, HoloLens, Vuzix M-100, SeeThru, Optinvent ORA-S, Epson Moverio BT-300, Epson Moverio BT-2000, ODG R-7, binocular Smart Glasses, monocular Smart Glasses, and the like), wristbands, wearable items/devices, head-mounted displays (HMDs) (e.g., Oculus Rift, Sony HMZ-T3W, and the like), the like, and/or any combination of devices or entities adapted to perform the functions, operations, and/or processes described herein. The term user device 110 is intended to refer to any device that projects, superimposes, overlays, or otherwise provides an image on a surface with respect to a user's viewing angle or line of vision or a user device 110's angle. Certain devices within the scope of the term user device 110 may also not project/provide any image on a surface; instead, an image may be implanted directly in the optic nerve or even the brain of a user utilizing (e.g., wearing) the user device.

The term user device 110 is intended to also include any other peripheral electronics and functionality that may be provided in conjunction with such devices. For example, a user device 110 may include speakers, headphones, or other electronic hardware for audio output, a plurality of display devices (e.g., the use of two display devices, one associated with each of the user's eyes, to enable a stereoscopic, three-dimensional viewing environment), one or more position sensors (e.g., gyroscopes, global positioning system receivers, and/or accelerometers), battery packs, beacons for external sensors (e.g., infrared lamps), or the like. In one embodiment, the user device 110 can be used to provide an augmented reality environment/area, a mixed reality environment/area, and/or similar words used herein interchangeably to a user. The terms augmented/mixed environment/area should be understood to refer to a combined environment/area including the physical environment/area and elements of a virtual environment/area.

As shown in FIG. 3, the user device 110 can include an antenna 312, a transmitter 304 (e.g., radio), a receiver 306 (e.g., radio), and a processing element 308 (e.g., CPLDs, microprocessors, multi-core processors, co-processing entities, ASIPs, microcontrollers, and/or controllers) that provides signals to and receives signals from the transmitter 304 and receiver 306, respectively. Certain embodiments of the user device 110 may also include and/or be associated with any of a variety of sensors (e.g., three-dimensional sensors, depth cameras, three-dimensional scanners, binocular cameras, stereo-vision systems, and the like). Still further, other input methods, including eye tracking devices, mind-reading interfaces, and body hacks (e.g., implanted sub-skin sensors) may be utilized in conjunction with and/or incorporated as components of the user device 110 described herein.

The signals provided to and received from the transmitter 304 and the receiver 306, respectively, may include signaling information in accordance with air interface standards of applicable wireless systems. In this regard, the user device 110 may be capable of operating with one or more air interface standards, communication protocols, modulation types, and access types. More particularly, the user device 110 may operate in accordance with any of a number of wireless communication standards and protocols, such as those described above with regard to the control system 100. In a particular embodiment, the user device 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, WiMAX, UWB, IR, NFC, Bluetooth' Smart, USB, and/or the like. Similarly, the user device 110 may operate in accordance with multiple wired communication standards and protocols, such as those described above with regard to the control system 100 via a network interface 320.

Via these communication standards and protocols, the user device 110 can communicate with various other entities (e.g., an acquisition/display entity 115 and/or a location device 415) using concepts such as Unstructured Supplementary Service Data (US SD), Short Message Service (SMS), Multimedia Messaging Service (MIMS), Dual-Tone Multi-Frequency Signaling (DTMF), and/or Subscriber Identity Module Dialer (SIM dialer). The user device 110 can also download changes, add-ons, and updates, for instance, to its firmware, software (e.g., including executable instructions, applications, program modules), and operating system.

According to one embodiment, the user device 110 may include a location and/or perspective determining aspect, device, module, functionality, and/or similar words used herein interchangeably. For example, the user device 110 may include outdoor and/or environmental positioning aspects, such as a location module adapted to acquire, for example, latitude, longitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information may be determined by triangulating the user device 110's position in connection with a variety of other systems, including cellular towers, Wi-Fi access points, and/or the like. Similarly, the user device 110 may include indoor positioning aspects, such as a location/environment module adapted to acquire, for example, latitude, longitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), nearby components with known relative locations, and/or the like. For instance, such technologies may include the iBeacons, Gimbal proximity beacons, Bluetooth Low Energy (BLE) transmitters, Near Field Communication (NFC) transmitters, three-dimensional scanners, robot vision systems, environmental mapping devices, and/or the like. These indoor positioning aspects can be used in a variety of settings to determine the location of someone or something to within inches or centimeters.

The user device 110 may also detect markers and/or target objects. For example, the user device 110 may include readers, scanners, cameras, sensors, and/or the like for detecting when a marker and/or target object and/or a pattern of unique colors (or a unique subset thereof; see FIG. 16B) on the improved conveyor belt is within its point-of-view (POV)/field-of-view (FOV) of the real world environment/area. For example, readers, scanners, cameras, sensors, and/or the like may include RFID readers/interrogators to read RFID tags, scanners and cameras to capture visual patterns and/or codes (e.g., text, barcodes, character strings, Aztec Codes, MaxiCodes, information/data Matrices, QR Codes, electronic representations, and/or the like), and sensors to detect beacon signals transmitted from target objects or the environment/area in which target objects are located. For example, in some embodiments, the user device 110 may detect signals transmitted from the control system 100 (FIGS. 1-2), an asset 10 (FIG. 5), an improved conveyor belt assembly (FIG. 10), and/or from a location device 415 (FIG. 1).

In one embodiment, the user device 110 may include accelerometer circuitry for detecting movement, pitch, bearing, orientation, and the like of the user device 110. This information/data may be used to determine which area of the augmented/mixed environment/area corresponds to the orientation/bearing of the user device 110 (e.g., x, y, and z axes), so that the corresponding environment/area of the augmented/mixed environment/area may be displayed via the display along with a displayed image. For example, the user device 110 may overlay an image in a portion of the user's POV/FOV of the real world environment/area.

The user device 110 may also comprise or be associated with an asset indicia reader, device, module, functionality, and/or similar words used herein interchangeably. For example, the user device 110 may include an RFID tag reader configured to receive information from passive RFID tags and/or from active RFID tags associated with an asset 10. The user device 110 may additionally or alternatively include an optical reader configured for receiving information printed on an asset 10. For example, the optical reader may be configured to receive information stored as a bar code, QR code, or other machine-readable code. The optical reader may be integral to the user device 110 and/or may be an external peripheral device in electronic communication with the user device 110. The optical reader may also or alternatively be configured to receive information stored as human readable text, such as characters, character strings, symbols, and/or the like. The user device 110 may utilize the asset indicia reader to receive information regarding an asset 10 to be sorted.

In at least one embodiment, the user device 110 may be equipped with an optical reader or the like configured to receive and/or monitor information associated with an improved conveyor belt, as detailed elsewhere herein. For example, the optical reader may be configured to receive and/or otherwise monitor and/or recognize a plurality of non-repeating patterned stripes located on the improved conveyor belt and associated with respective assets or packages. In this manner, the optical reader may be configured to identify a particular asset or package and based upon the sensed or detected pattern, retrieve and/or otherwise generate/display data associated with the particular asset or package. Such data may include package-level detail, sort instructions for the package (as detailed elsewhere herein), and/or assignment data, reflective of whether the package is assigned to a particular user (e.g., sort employee) utilizing the user device in question. For example, where the user devices are individually wearable glasses, each may be associated with a specific sort employee wearing the glasses at that time, such that only those packages assigned to that sort employee are analyzed and processed.

The user device 110 may also comprise a user interface (that can include a display or see-through display 114 coupled to a processing element 308 and/or a user input device 318 coupled to a processing element 308). For example, the user interface may be a user application, browser, user interface, and/or similar words used herein interchangeably executing on and/or accessible via the user device 110 to interact with and/or cause display of information, as described herein. The user interface can comprise any of a number of devices allowing the user device 110 to receive data, such as a keypad (hard or soft), a touch display, voice or motion interfaces, or other input device. In embodiments including a keypad, the keypad can include (or cause display of) the conventional numeric (0-9) and related keys (#, *), and other keys used for operating the user device 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user device 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user device 110. As indicated, this may include a user application that is resident on the entity or accessible through a browser or other user interface for communicating with the control system 100 (FIG. 2), location device 415 (FIG. 1), and/or various other computing entities.

In another embodiment, the user device 110 may include one or more components or functionality that are the same or similar to those of the control system 100, as described in greater detail above. As will be recognized, these architectures and descriptions are provided for exemplary purposes only and are not limiting to the various embodiments.

Figure 4:
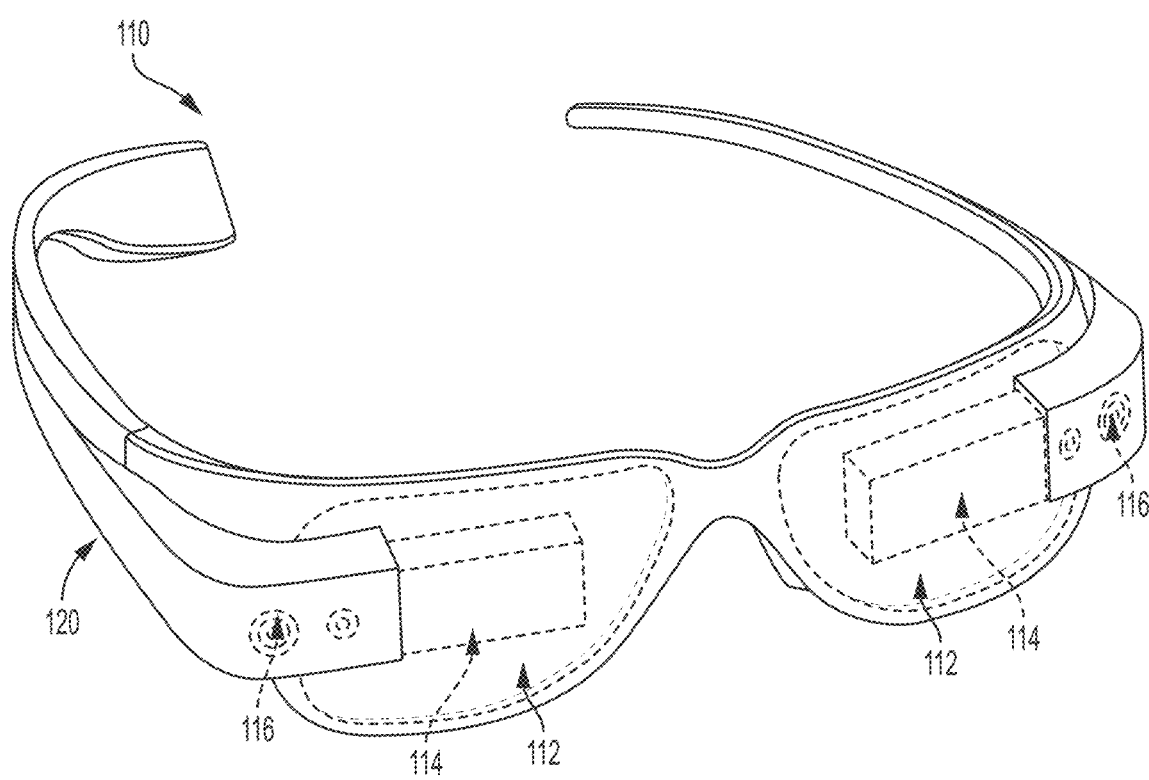
Figure 10:
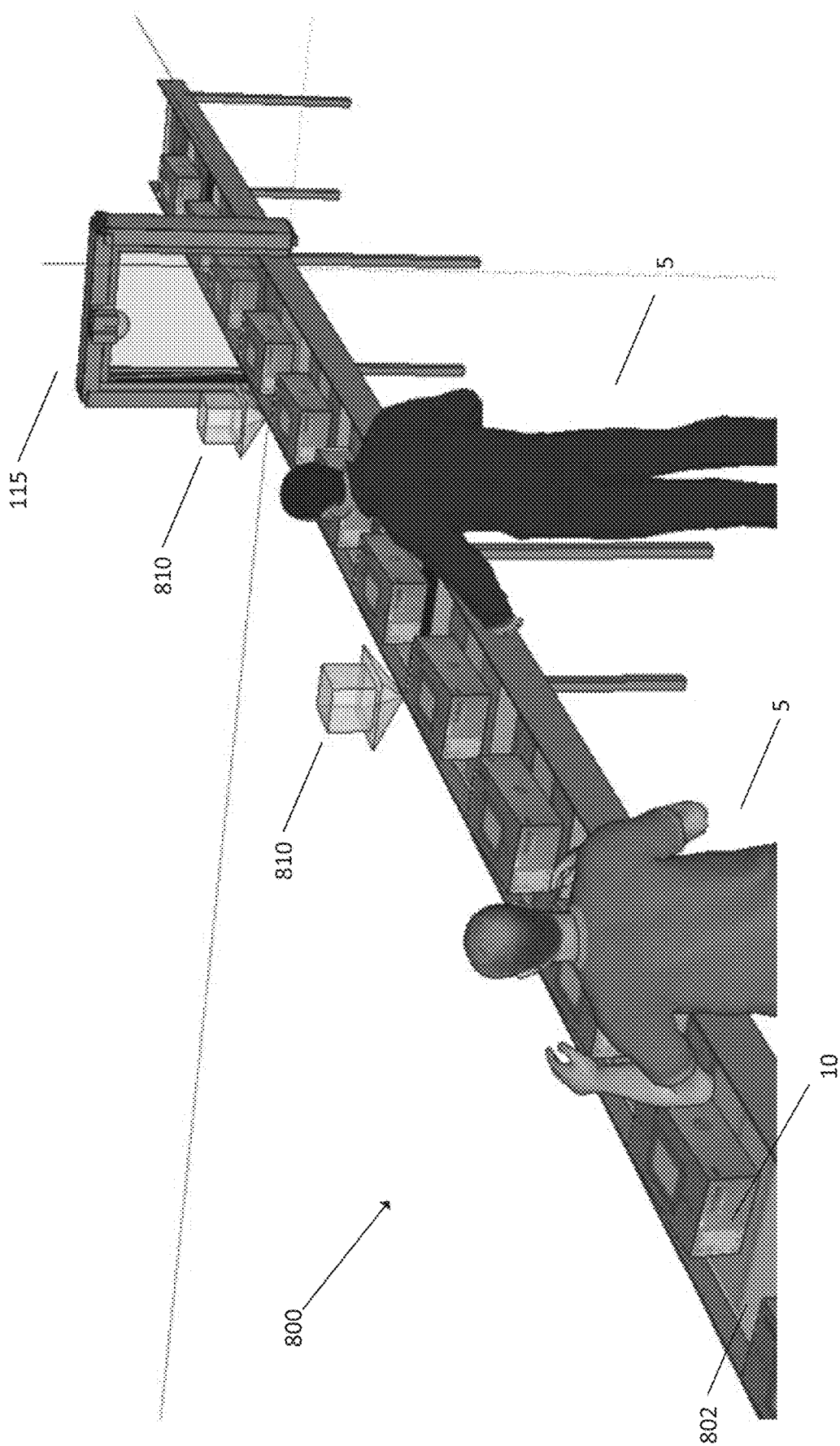

FIG. 4 shows an embodiment of an exemplary user device 110 that sends, receives, and/or displays information related to the asset 10 (FIG. 5) and/or the sort location 400 (FIG. 1) and/or the improved conveyor belt assembly 800 (FIG. 10). In one embodiment, the user device 110 includes a set of glasses 112, as described in U.S. Pat. No. 7,063,256; U.S. Publication No. 2016/0370452; and U.S. Ser. No. 15/390, 109, all of which as are hereby incorporated by reference in their entirety. The glasses 112 include the display 114 (which may be monocular, as illustrated, or binocular) and an information gathering device such as an image camera 116. The user device 110 may further include a local computer 120 having the processing device 308 (FIG. 3), the antenna 312 (FIG. 3), the network interface 320 (FIG. 3), the transmitter 304 (FIG. 3), the receiver 306 (FIG. 3), the volatile memory 322 (FIG. 3), and/or the non-volatile memory 324 (FIG. 3). In some embodiments, the user device 110 is an optical, wearable display, such as Google Glass, available from Google Inc., HoloLens available from Microsoft Inc., Epson Moverio BT-300 or BT-2000, ODG R-7, or the like. In certain embodiments, the user device 110 is a monocular-based set of glasses; in other embodiments, a binocular-based set of glasses may be provided.

In still other embodiments, the display may be a device separate from the glasses through which the items may be viewed or, in other embodiments, on which a representation of the item may be viewed wherein such representation may include outline images of the items, symbols that represents the items or characteristic information about the items.

Figure 8:
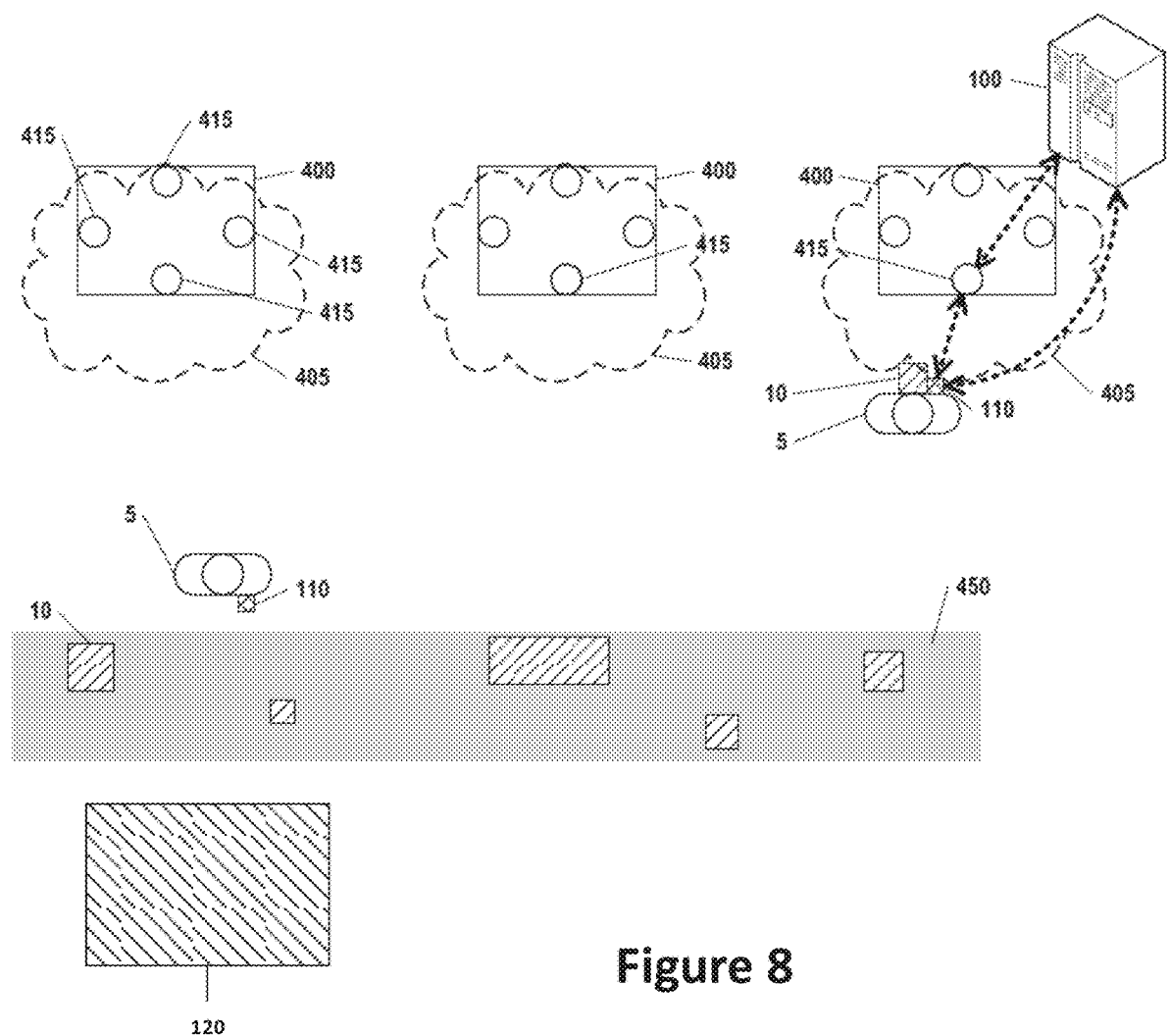

In the embodiment shown in FIG. 4, the information gathering device is an image camera 116 that is mounted on the glasses 112. In other embodiments, the information gathering device may be a three-dimensional depth sensor, a stereo camera, and/or the like. The image camera 116, in one embodiment, is a center-view visible light camera that is used to acquire label images and may acquire images associated with an asset 10 (FIG. 5) and/or an improved conveyor belt assembly 800 (FIG. 10). The POV/FOV of the image camera 116 may correspond to the direction of the user device 110 and therefore the POV/FOV of the user 5 (FIG. 8). With the POV/FOV, images can be presented to the user of target objects (e.g., an asset 10) that are within the environment/area of the user device 110. For example, while the user 5 (FIG. 8) is going about his daily work, the user device 110 can display the corresponding environment/area and images overlaid on the same. The displayed image may include images (e.g., stock images of assets 10 or actual images of assets 10), text (sorting instructions or warnings), video (e.g., handling procedures), menus, selection boxes, navigation icons, and/or the like. In this manner, the displayed image(s) is merged with objects in the physical world/environment in a seamless manner, so as to provide a sense that the displayed image(s) is an extension of the reality present in the physical world/environment. This is oftentimes referred to as a "mixed reality" or a "hybrid reality" environment, whereby the merging of real and virtual worlds produces a new environment containing visualizations of both physical and digital objects that are able to co-exist and interact relative to one another in a real-time manner. Stated otherwise, provided and/or generated is an overlay of synthetic content on the real world or physical environment, with the former being anchored to and able to in a real-time manner (e.g., upon movement of a user) interact with the real world or physical environment (sic).

The local computer 120 is comprised of a computer including the network interface 320 (FIG. 3) which may determine the orientation and position determination of the user 5 (FIG. 8) based on images obtained from the image camera 116. Alternatively, the local computer 120 may determine the orientation and position of the user 5 (FIG. 8) based on a location module adapted to acquire, for example, latitude, longitude, geocode, course, direction, heading, speed, universal time (UTC), date, and/or various other information/data, as described above. The local computer 120 also performs view-plane computations, which is a process that uses the three-dimensional position data for each relevant object, and determines the position and orientation of the wearer of the user device 110. The local computer 120 manages the application-provided display symbology for each relevant object to determine what is to be displayed in the display 114 and where to display the information such that it appears superimposed proximately about or on an item, such as an asset 10 (FIG. 5). The local computer 120 packaging may also contain a power source (not shown), which may be self-contained such as, for example, batteries or other forms of rechargeable, replaceable, reusable or renewable power sources. Peripherals may also be provided, including a belt bag (e.g., for holding the external battery or the like), an external scanner (e.g., Bluetooth capable or the like), and/or QR cards for a user to utilize when handling items. Additional details in this respect may be understood from U.S. Ser. No. 15/390,109, the contents of which as are incorporated herein by reference in their entirety.

C. Exemplary Improved Conveyor Belt Assembly

Figure 16A:
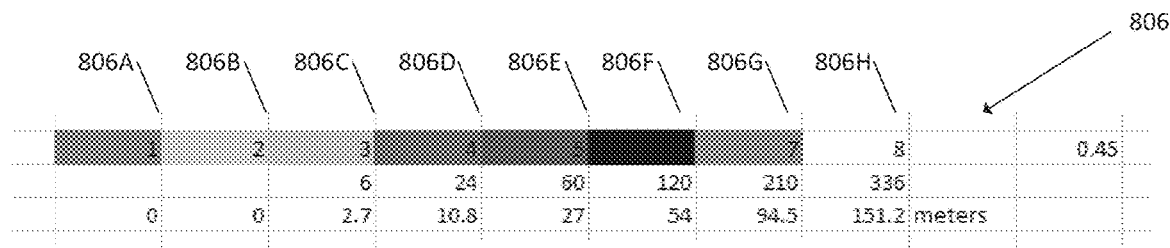
FIG. 16A is an illustration of a color spectrum utilized with the improved conveyor belt assembly according to one or more embodiments shown and described herein.
Figure 16B:
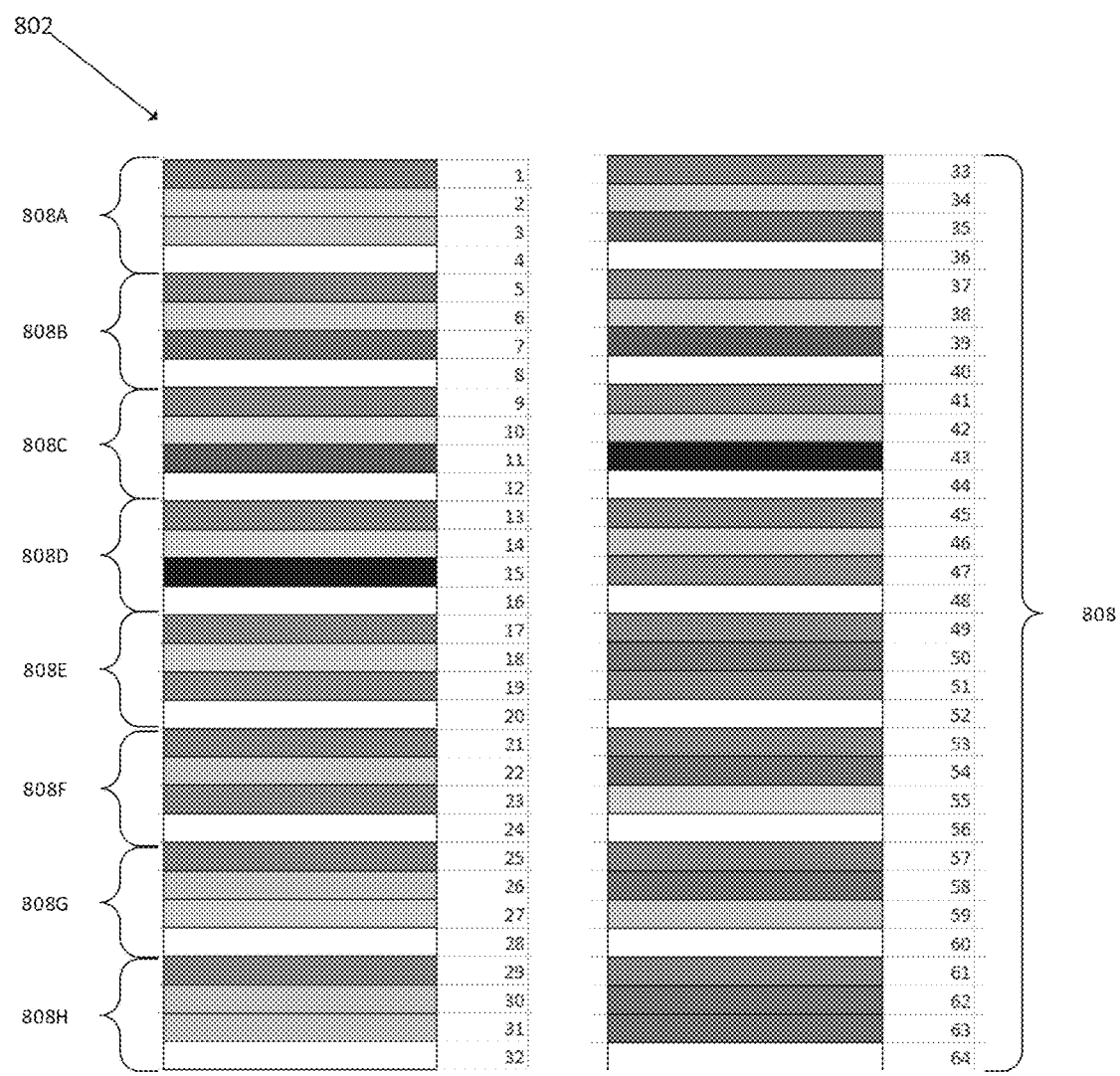
FIG. 16B is an illustration of a pattern of unique colors generated via the color spectrum utilized with the improved conveyor belt assembly according to one or more embodiments shown and described herein.

FIG. 10 depicts an improved conveyor belt assembly 800 in communication with the control system 100, where the improved conveyor belt assembly facilitates obtaining of asset 10 information and association thereof with a unique pattern of colored stripes 808 (see also FIGS. 16A-B). In the embodiment depicted in FIG. 10, the improved conveyor belt assembly 800 may comprise a conveying mechanism 802 and an acquisition/display entity 115 (see also FIG. 5), each of which as are described in further detail below.

1. Exemplary Improved Conveying Mechanism 802

FIG. 10 depicts an improved conveying mechanism 802 that has a pattern of stripes 808 (which may be colored) provided thereon. Via utilization of the pattern of stripes 808, the improved conveying mechanism is configured to enable a unique set of stripes to be associated with each asset 10 traveling upon the conveying mechanism. In this manner, a user 5 approaching the conveying mechanism and utilizing (e.g., wearing) a user device 110 may recognize and/or otherwise capture respectively unique sets of stripes approaching and based thereon (e.g., via communication with the acquisition device 115 and/or the control system 110) view one or more visual indicators 810 associated with the asset 10 that has been previously (e.g., via the acquisition device 115) associated with the unique sets of stripes (see also FIG. 16B). Advantageously, this configuration enables identification of the asset 10 from much longer distances (of the user relative to the conveying mechanism) than configurations wherein the user device must be sufficiently close to the asset so as to read/sense information directly therefrom.

With respect to the pattern of stripes 808 provided, reference now to FIGS. 16A and 16B is beneficial. In FIG. 16A, there is depicted an exemplary color spectrum 806 that may be utilized according to various embodiments. It should be understood, though, that in certain embodiments, varying degrees of grayscale-based stripes may be provided, as opposed to full color versions thereof. Still further, although FIG. 16A illustrates a set of eight (8) colors 806A-806H that may be utilized to generate the unique pattern of stripes 808 upon the conveying mechanism 802, it may be understood that less than eight or more than eight colors may be utilized, with the advantage being that the more colors used, the more permutations of unique sets of stripes may be generated.

Indeed, many more than eight colors may be utilized, as most cameras utilized today can differentiate between several million distinct colors. That said, at least one factor informing a particularly advantageous range of a volume of colors used is that the matching of unique permutations of the colors—and the colors themselves—to a picture or image captured or sensed in differing light conditions must be performed with relative speed. Utilizing millions of colors would result in tens of millions (if not more) permutations, the processing time associated with identifying matches therein as would be quite lengthy. A lesser volume of colors is thus advantageous. Offsetting this potential limitation in certain embodiments on the number of colors used is the ability to calibrate the user device (or sensors associated therewith) via a reference chart of available colors. This chart may be electronically generated and/or a physical component in the physical realm (e.g., a poster near the conveying mechanism that can be used to calibrate the sensor by providing examples of the same colors in the conveyor, under the same light conditions currently present, so that the software within the user device can take a picture thereof and—as necessary—adjust hue to read the pattern and/or color intensity correctly. In certain embodiments, this color calibration may occur periodically (e.g., daily); in other embodiments, it need only occur if light conditions surrounding the conveying mechanism change, which change may also be automatically sensed and/or monitored.

For example, where eight colors are used, more than 300 permutations of unique sets of stripes may be provided (and thus assigned uniquely to associated assets 10), at least where the sets of stripes are defined by three consecutive stripes positioned adjacent one another. It should be understood, of course, that more than three consecutive stripes may be utilized to define a unique set of stripes, as may be desirable, for example, relative to larger assets 10. It is not envisioned, though, that fewer than three colors (of colors 806A-806H) would ever be utilized so as to define the color spectrum 806. Still further, the colors 806A-806H illustrated are exemplary (e.g., red, yellow, green, blue, purple, black, gray, and white); it should understood that any of a variety of known colors and/or grayscale depictions may be used. In other embodiments as well, the colors of the stripes may be provided with a pattern thereon, whether a hatching or the like, as described in further detail in U.S. Pat. No. 9,599,459, the contents of which as are incorporated herein in their entirety.

FIG. 16B depicts an exemplary pattern of stripes 808 generated utilizing the color spectrum 806 of FIG. 16A. Rows as placed upon the conveying mechanism 802 (or otherwise incorporated within, for example, as a material of the same), may be understood as being numbered consecutively 1-64. With reference to FIG. 10, it may be also understood that according to certain embodiments, the orientation of the rows/stripes within the pattern 808 may be oriented transverse to a machine direction (or direction of travel, as seen in FIG. 5) of the conveying mechanism. In certain embodiments, when so transversely oriented, the stripes may extend substantially continuously across an entire width of the conveying mechanism; in other embodiments, however, the stripes may only extend across a majority of the width, as may be desirable. In still other embodiments, the stripes may be oriented other than in a transverse direction relative to the direction of travel of the conveying mechanism 802.

Referencing still further FIG. 16B, it may be understood that within the pattern of stripes 808 generated there are distinctly unique sets of stripes 808A-808H, which may each include three, four, or even more sets of adjacently positioned/oriented stripes. In any of these and still other embodiments, it should be noted that the pattern of stripes 808 and the unique sets defined there-within are non-repeating, as should be evident from FIG. 16B. It is in this manner that the acquisition device 115 is able to associate a unique set of stripes (e.g., 808A) with a first asset 10 and a second unique set of stripes (e.g., 808B) with a second asset, such that thereafter a user 5 wearing the user device 110 may utilize the user device to recognize (e.g., image capture) any of the unique sets of stripes (e.g., 808A-808H and the like) and therefrom alone determine asset identifier data associated with the particular asset 10 positioned atop the unique set of stripes recognized. If the pattern were repeating, or at least not sufficiently non-repeating, multiple assets could conceivably be associated with the same unique set of stripes (e.g., 808A); however, as designed, the pattern of stripes 808 has sufficient permutations to provide a non-repeating pattern so as to facilitate unique association of each set of stripes with a unique asset.

Remaining with FIG. 16B but also with reference to FIG. 10, it may be understood also that each of the stripes defining the pattern of stripes 808 may have the substantially the same width. In certain embodiments, however, in addition to having the non-repeating pattern of colors, the widths of the stripes may also be variable, so as to generate still further unique permutations within the pattern. In at least one embodiment, the widths of each of the stripes may be approximately ten (10) centimeters. In other embodiments, the widths may be greater than or less than ten centimeters, for example in a range of approximately 5-15 centimeters or in a range of approximately 2-20 centimeters. Additional details in this respect are described in detail in U.S. Pat. No. 9,599,459, the contents of which as are incorporated herein in their entirety.

It should also be understood that according to various embodiments, in addition to having a pattern of stripes 808 incorporated as part of the conveying mechanism 802, each of the stripes within the pattern may be made of different materials and/or differently formed. For example, certain stripes may be formed from a material that is akin to conventional conveyor belts, while other stripes may be formed from a material having a high lumen factor or the like. Due to known widths of the stripes, beyond associating a unique set of stripes (e.g., 808A-808H) with each individual asset 10, the improved conveyor belt assembly 800, whether due to utilization of the acquisition device 115 or otherwise, may also determine relative dimensions of each asset 10. Additional details in this respect and otherwise are described in further detail in U.S. Pat. No. 9,599,459, the contents of which as are incorporated herein in their entirety.

2. Exemplary Acquisition/Display Entity 115

FIG. 10 depicts an acquisition/display entity 115 according to one embodiment that operates in communication with the control system 100, where the acquisition/display entity 115 is configured to obtain/show/transmit information or data associated with an asset 10 and/or the improved conveyor belt assembly (i.e., the unique pattern of colored stripes 808 (or a defined subset thereof) on the conveying mechanism 802 described previously herein). In the embodiment depicted in FIG. 10 the acquisition/display entity 115 includes one or more imaging devices configured to capture images (e.g., image data) of assets 10 (and/or item/shipment identifiers) moving along the conveying mechanism 402 and/or to capture images (e.g., image data) of the unique pattern of colored stripes 808 adjacent each asset 10 on the improved conveying mechanism 802, all as described elsewhere herein.

Reference to FIG. 5 is useful in this respect, wherein the acquisition/display entity 115 in communication with the control system 100 is also illustrated, where the acquisition/display entity 115 shows information associated with an asset 10 (and/or the improved conveying mechanism 802) according to various embodiments. In the embodiment depicted in FIG. 5, the acquisition/display entity 115 may comprise not only one or more acquisition devices 410 (e.g., imaging devices) for acquiring information/data from an asset 10 and/or the improved conveying mechanism 802 (as illustrated also in FIG. 10), but also a display 420 for showing information/data associated with the asset 10, as described in U.S. Publication No. 2015/0262348, which is hereby incorporated by reference in its entirety. In one embodiment, each asset 10 may include an item/shipment identifier, such as an alphanumeric identifier. Such item/shipment identifiers may be represented as text, barcodes, Aztec Codes, MaxiCodes, Data Matrices, Quick Response (QR) Codes, electronic representations, tags, character strings, and/or the like. The unique item/shipment identifier (e.g., 123456789) may be used by the carrier to identify and track the item as it moves through the carrier's transportation network. Further, such item/shipment identifiers can be affixed to items by, for example, using a sticker (e.g., label) with the unique item/shipment identifier printed thereon (in human and/or machine readable form) or an RFID tag with the unique item/shipment identifier stored therein.

As shown, the one or more acquisition devices 410 may be configured for acquiring asset identifier data and/or conveyor belt data (see also FIG. 11, Step 901) (including item/shipment identifiers and/or capture of a subset of the unique pattern of colored stripes 808 (see FIG. 16B) upon which the asset 10 is located) for one or more acquisition zones 401 positioned in front of one or more work zones 405. The acquisition devices 410 may communicate this data to the control system 100 (FIG. 2). Thus, an item traveling on a conveying mechanism 402 (FIG. 5) or an improved conveying mechanism 802 (FIG. 10) (e.g., conveyor belt, slide, chute, bottle conveyor, open or enclosed track conveyor, I-beam conveyor, cleated conveyor, and/or the like) can pass through an acquisition zone 401 prior to entering an intake location 450. Certain data associated with the item or asset—along with certain data associated with, for instance, one or more characteristics of the improved conveying mechanism itself—may be thus captures in the acquisition zone 401.

Acquisition of data in the acquisition zone 401 may, in certain embodiments, always occur upstream (see FIGS. 5 and 10 alike), namely prior to the asset 10 or item entering an intake location 450 where personnel or users of the systems described herein may be tasked with sorting the asset or item. However, as will be understood by one skilled in the art, the acquisition zone 401 may at least partially overlap the intake location 450 such that an asset 10 may reside in both the acquisition zone 401 and intake location 450 simultaneously. In various embodiments, the acquisition zone 401 and intake location 450 may be substantially the same size and shape. However, as will be understood by one skilled in the art, the acquisition zone 401 and intake location 450 may be of different sizes and/or shapes. In various embodiments, the acquisition device 410 can be positioned substantially above the conveying mechanism 402 or the improved conveying mechanism 802. However, the acquisition device 410 may be located at any other position in relation to the conveying mechanism 402 or the improved conveying mechanism 802, such as substantially above and adjacent to an edge of the conveying mechanism 402 or the improved conveying mechanism 802.

In certain embodiments, the acquisition device 410 may include or be associated with one or more imaging devices configured to capture images (e.g., image data) of assets 10 (and/or item/shipment identifiers) moving along the conveying mechanism 402 and/or to capture images (e.g., image data) of various subsets of the unique pattern of colored stripes 808 provided on the improved conveying mechanism 802. For example, the acquisition device 410 may include or be associated with a video camera, camcorder, still camera, web camera, Single-Lens Reflex (SLR) camera, high-speed camera, and/or the like. In various embodiments, the acquisition device 410 may be configured to record high-resolution image data (e.g., images comprising at least 480 horizontal scan lines) and/or to capture image data at a high speed (e.g., utilizing a frame rate of at least 60 frames per second). Alternatively, the acquisition device 410 may be configured to record low-resolution image data (e.g., images comprising less than 480 horizontal scan lines) and/or to capture image data at a low speed (e.g., utilizing a frame rate less than 60 frames per second). As will be understood by those skilled in the art, the acquisition device 410 may be configured to operate with various combinations of the above features (e.g., capturing images with less than 480 horizontal scan lines and utilizing a frame rate of at least 60 frames per second, or capturing images with at least 480 horizontal scan lines and utilizing a frame rate less than 60 frames per second).

In various embodiments, the acquisition device 410 may be configured to capture image data of the assets 10 and conveying mechanism 402 of sufficient quality that a user viewing the image data on the display 420 can identify each asset 10 represented in the displayed image data. In other embodiments, the acquisition device 410 may be configured to capture image data of various subsets of the unique pattern of colored stripes 808 (see FIG. 16B) on the improved conveying mechanism 802 relative to the assets 10 of sufficient quality that the control system 100 may accurately and efficiently associate the image data—and thus the unique pattern of colored stripes immediately adjacent and/or under each asset with respective assets. Still further, in embodiments wherein the conveying mechanism 402 and assets 10 are moving at a high rate of speed, the acquisition device 410 may be configured to capture image data at a high speed. The image data can be captured in or converted to a variety of formats, such as Joint Photographic Experts Group (JPEG), Motion JPEG (MJPEG), Moving Picture Experts Group (MPEG), Graphics Interchange Format (GIF), Portable Network Graphics (PNG), Tagged Image File Format (TIFF), bitmap (BMP), H.264, H.263, Flash Video (FLV), Hypertext Markup Language 5 (HTML5), VP6, V8, and/or the like. In certain embodiments, various features (e.g., text, objects of interest, codes, item/shipment identifiers, and/or the like) can be extracted from the image data.

While in at least one embodiment the acquisition device 410 is image-based only, the acquisition device 410 may additionally or alternatively include or be associated with one or more scanners, readers, interrogators, and similar words used herein interchangeably configured for capturing item indicia for each asset 10 (e.g., including item/shipment identifiers). For example, the scanners may include a barcode scanner, an RFID reader, and/or the like configured to recognize and identify item/shipment identifiers associated with each asset 10. In one embodiment, the acquisition device 410 may be capable of receiving visible light, infrared light, radio transmissions, and other transmissions capable of transmitting information to the acquisition device 410. Similarly, the acquisition device 410 may include or be used in association with various lighting, such as light emitting diodes (LEDs), Infrared lights, array lights, strobe lights, and/or other lighting mechanisms to sufficiently illuminate the zones of interest to capture image data for analysis. These capabilities may be, for example, provided as a "fail-safe" so as to ensure that the optical imaging capabilities (detailed previously herein) configured to capture and/or otherwise monitor the unique pattern of colored stripes 808 on the improved conveying mechanism 802 are sufficiently accurate.

In various embodiments, information associated with items can be presented via a display 420. The display 420 may take a variety of forms, such as a Liquid Crystal Display (LCD), a Liquid Crystal on Silicon (LCoS) display, an Active Matrix Organic Light-Emitting Diode (AMOLED) display, a Digital Light Processing (DLP) display, a plasma display, a Cathode Ray Tube (CRT) display, a projected laser, an electronic ink display, and/or the like. The display 420 may be in direct communication with the acquisition device 410 or may be indirectly in communication with the acquisition device through the control system 100 (FIG. 2). The display 420 may be configured for direct viewing, rear projection onto a surface, or front projection onto a surface. For example, in some embodiments, the display 420 may project images directly on or proximate to the assets 10, as described in U.S. Pat. No. 7,090,134, which is incorporated herein by reference in its entirety.

The display 420 may be fixed in a particular location, it may be movable to various locations, or it may be wearable by a user (see FIG. 4). In various embodiments, the display 420 may display images using a black-and-white display, a grey-scale display, and/or a color display. The displayed information may be correlated to the specific assets 10, or may be general information unrelated to the specific assets 10 (e.g., information related to the non-repeating pattern of stripes, or the like). The displayed information, for instance, may be in the form of sorting instructions informing a user located near the intake location 450 how each asset 10 should be processed or handled, the source of an asset 10, and/or the like. Alternatively, the displayed information may comprise information regarding the volume of assets 10 on the conveying mechanism (402, 802), or information regarding upcoming scheduled user breaks (e.g., a lunch break). As will be recognized, a variety of other approaches and techniques can be used to adapt to various needs and circumstances. Similar to the controller system 100 described above, in one embodiment, the acquisition/display entity 115 may also include one or more communications interfaces for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as FDDI, DSL, Ethernet, ATM, frame relay, DOCSIS, or any other wired transmission protocol. Similarly, the acquisition/display entity 115 may be configured to communicate via wireless external communication networks using any of a variety of protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, NFC protocols, Bluetooth' protocols, wireless USB protocols, and/or any other wireless protocol.

As will be understood by those skilled in the art, the system may include more than one acquisition device 410 and/or display 420 and/or any combination thereof In various embodiments, one or more additional acquisition devices may be used to capture additional image data at one or more additional acquisition zones located on the conveying mechanisms 402/802 or an additional conveying mechanism. Such additional acquisition devices may be located, for example, after the flow of items along the conveying mechanism 402/802 is disturbed (e.g., the flow of assets 10 is culled, merged with an additional flow of assets 10, or diverted to an additional conveying mechanism). Alternatively, one or more additional acquisition devices may be located along the conveying mechanism 402, 802 after the intake location 450, such that the one or more additional acquisition devices may capture updated image data after one or more of the assets 10 may have been removed from the conveying mechanism 402, 802. In various embodiments, the one or more additional acquisition devices may include components substantially similar to the acquisition device 410. For example, the one or more additional acquisition devices may include or be associated with one or more imaging devices and one or more scanners, readers, interrogators, and similar words used herein interchangeably, as described above in regards to the acquisition device 410. However, the one or more additional acquisition devices may include fewer components than acquisition device 410. For example, the one or more additional acquisition devices may not include a scanner, reader, interrogator, or similar words used herein, and may be configured to receive item identifiers from the acquisition device 410.

In various embodiments, one or more additional displays may be located such that they are visible from one or more additional work zones (e.g., an additional work zone located on the conveying mechanism after the intake location 450). The one or more additional displays may be substantially similar to the display 420. For example, the one or more additional displays may be configured to display image data to an additional user sorting items at an additional sorting location. The one or more additional displays may be configured to display the image data captured by the acquisition device 410, or may be configured to present the updated image data captured by one or more additional acquisition devices.

Figure 6A:
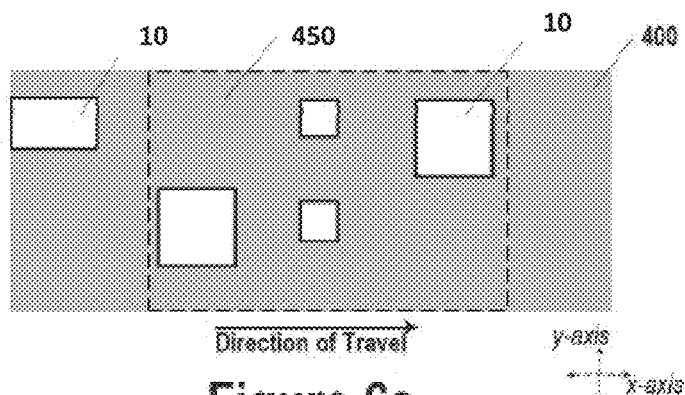
Figure 6B:
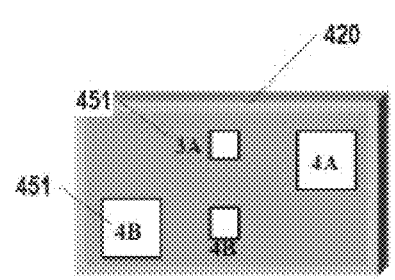

FIGS. 6A and 6B and FIGS. 7A and 7B show exemplary schematics showing the intake location 450 and a display 420 at particular points in time. As shown in FIG. 6A, the intake location 450 contains four assets 10 moving along the conveying mechanism 402 (by analogy also relative to the improved conveying mechanism 802) with a certain orientation. At the same time, the display 420 may be configured to present captured image data (e.g., video) containing representations of the same four assets 10 with corresponding display features 451 as shown in FIG. 6B. In the embodiment depicted in FIG. 6B, the display features 451 may be utilized to convey additional information to a user 5 (FIG. 8) related to (e.g., assigned to) the asset 10. For example, as shown in FIG. 6B, the display features 451 indicate different designations for each of the assets 10, depicted as "3A," "4A," and "4B," which may indicate different sort locations 400 (FIG. 8) to which each of the assets 10 are to be placed.

Figure 7A:
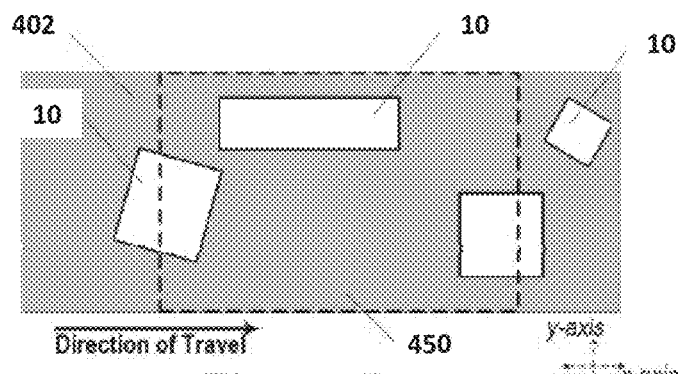
Figure 7B:
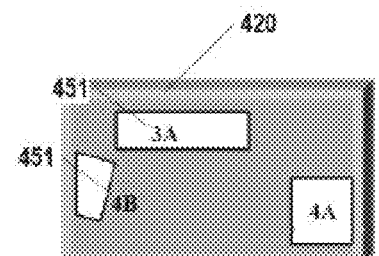

FIG. 7A shows a second exemplary schematic of an intake location 450; however as shown in FIG. 7A, only one asset 10 is completely within the intake location 450 and two assets 10 are partially within the intake location 450. The corresponding display 420, shown in FIG. 7B, presents captured image data of the one full item and two partial items corresponding to each of the items 450 at least partially within the intake location 450 and corresponding display features 451 located on or near each asset. Alternatively, the display 420 may incorporate a predetermined delay (e.g., 20 seconds), prior to presenting the image data (e.g., video) via the display 420. Additional details in this respect may be understood from U.S. Ser. No. 15/390,109, the contents of which as are incorporated herein by reference in their entirety.

D. Exemplary Location Device

In various embodiments, one or more sort locations 400 may be associated with one or more location devices 415 configured for identifying one or more assets 10 being sorted to each sort location 400. As non-limiting examples, such sort locations 400 may include one or more vehicles (e.g., aircraft, tractor-trailer, cargo container, local delivery vehicles, and/or the like), pallets, identified areas within a building, bins, chutes, conveyor belts, shelves, and/or the like. The one or more location devices 415 may be attached to a sort location 400 or located within a sort location 400. Alternatively the one or more location devices 415 may be located adjacent to a sort location 400 or otherwise proximate the sort location 400. In various embodiments, a location device 415 may be located proximate to an area designated to store the sort location 400. For example, when the sort location 400 includes a delivery vehicle, a location device 415 may be located above each of a plurality of parking areas designated for one or more delivery vehicles.

In various embodiments, the one or more location devices 415 may include components functionally similar to the control system 100 and/or the user device 110. As noted above in referencing the control system 100, the term "computing entity" may refer to, for example, one or more computers, computing entities, desktops, mobile phones, tablets, phablets, notebooks, laptops, distributed systems, gaming consoles (e.g., Xbox, Play Station, Wii), watches, glasses, key fobs, RFID tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Like the user device shown schematically in FIG. 3, the location device 415 can include an antenna, a transmitter (e.g., radio), a receiver (e.g., radio), and a processing element (e.g., CPLDs, microprocessors, multi-core processors, co-processing entities, ASIPs, microcontrollers, and/or controllers) that provides signals to and receives signals from the transmitter and receiver, respectively.

The signals provided to and received from the transmitter and the receiver, respectively, may include signaling information in accordance with air interface standards of applicable wireless systems. In this regard, the location device 415 may be capable of operating with one or more air interface standards, communication protocols, modulation types, and access types. More particularly, the location device 415 may operate in accordance with any of a number of wireless communication standards and protocols, such as those described above with regard to the control system 100. In a particular embodiment, the location device 415 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, WiMAX, UWB, IR, NFC, Bluetooth', USB, and/or the like. Similarly, the location device 415 may operate in accordance with multiple wired communication standards and protocols, such as those described above with regard to the control system 100 via a network interface.

Via these communication standards and protocols, the location device 415 can communicate with various other entities (e.g., the user device 110) using concepts such as USSD, SMS, MMS, DTMF, and/or SIM dialer. The location device 415 can also download changes, add-ons, and updates, for instance, to its firmware, software (e.g., including executable instructions, applications, program modules), and operating system.

According to one embodiment, the location device 415 may include a location determining aspect, device, module, functionality, and/or similar words used herein interchangeably. For example, the location device 415 may include outdoor positioning aspects, such as a location module adapted to acquire, for example, latitude, longitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information may be determined by triangulating the location device 415's position in connection with a variety of other systems, including cellular towers, Wi-Fi access points, and/or the like. Similarly, the location device 415 may include indoor positioning aspects, such as a location module adapted to acquire, for example, latitude, longitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, BLE transmitters, NFC transmitters, and/or the like. These indoor positioning aspects can be used in a variety of settings to determine the location of someone or something to within inches or centimeters.

The location device 415 can also include volatile storage or memory and/or non-volatile storage or memory, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the location device 415. As indicated, this may include a user application that is resident on the entity or accessible through a browser or other user interface for communicating with the control system 100, user device 110, and/or various other computing entities.

In another embodiment, the location device 415 may include one or more components or functionality that are the same or similar to those of the control system 100 or user device 110, as described in greater detail above. As will be recognized, these architectures and descriptions are provided for exemplary purposes only and are not limiting to the various embodiments. Additional details in this respect may be understood from U.S. Ser. No. 15/390,109, the contents of which as are incorporated herein by reference in their entirety.

E. Exemplary Sort Location

Figure 9:
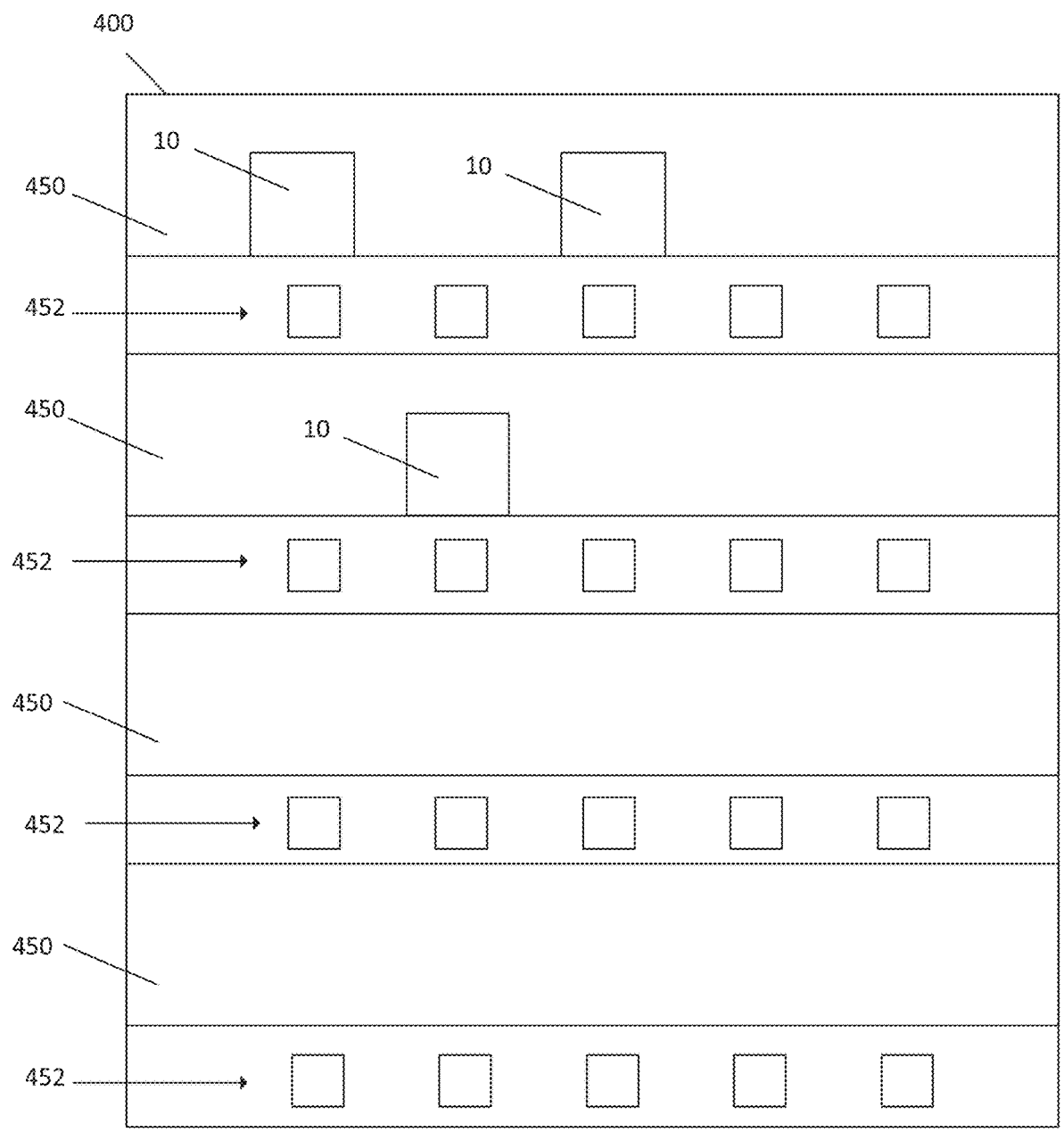

Referring to FIG. 9, an exemplary sort location 400 is schematically depicted. As described above, the sort location 400 may include may include one or more vehicles (e.g., aircraft, tractor-trailer, cargo container, local delivery vehicles, and/or the like), pallets, identified areas within a building, bins, chutes, conveyor belts, shelves, and/or the like. In the embodiment depicted in FIG. 9, the sort location 400 includes a plurality of shelves 450 onto which the assets 10 may be placed. While FIG. 9 depicts the plurality of shelves 450 as being stacked in a vertical direction, it should be understood that the shelves 450 may be arranged in any suitable configuration to hold the assets 10. Each of the shelves 450 include one or more visual indicators 452 positioned on or proximate to the shelves 450. The visual indicators 452, much like the visual indicators 810 of the conveyor belt assembly 800 may assist in identifying an appropriate position for placement of the asset 10 within the sort location, as described in U.S. Pat. No. 9,156,628, which is incorporated herein in its entirety. In particular embodiments, for example, a user 5 (FIG. 8) may utilize the indicia reader of the user device 110 to scan, read, or otherwise receive asset identifier data from the asset 10 to identify, in cooperation with the control system 100, an appropriate position for placement of the asset 10 within the sort location 400. In other embodiments, the control system 100 may determine the appropriate position for placement of the asset within the sort location 400 and convey that information to the user device 110 in response to the user device having recognized a unique pattern of stripes on the improved conveyor mechanism 802 and queried the control system regarding the same, as will be detailed elsewhere herein.

Still further, the control system 100 may determine the appropriate position for placement of the asset 10 within the sort location 400 based on a variety of factors. For example and without limitation, the control system 100 may determine the appropriate position for placement of the asset 10 within the sort location 400 based on the destination of the assets 10. When the sort location 400 includes a vehicle, such as a delivery truck, the assets 10 may be placed within the sort location 400 based on the order in which the assets 10 will be unloaded and delivered. In some embodiments, the control system 100 may identify an asset 10 designated for special or expedited handling (sometimes referred to as a "hot pull") based on the asset identifier data, and the control system 100 may determine placement of the asset 10 to facilitate easy access to the asset 10 in the sort location 400 to allow expedited handling. In some embodiments, the control system 100 may utilize an algorithm based on the attributes of the asset (such as the size and/or shape of the asset 10) to determine the placement of the asset 10 within the sort location 400 to optimize space and stability of the assets 10 within the sort location. One example of an algorithm to determine the placement of assets within the sort location 400 is described in U.S. Pat. No. 5,908,283, which is incorporated by reference herein in its entirety.

When the control system 100 identifies the appropriate position for the asset 10 within the sort location 400, the control system 100 may command one or more of the visual indicators 452 to provide a visual indication (e.g., by illuminating the visual indicator 452) of the appropriate location for the asset 10. Once the asset 10 is positioned in the appropriate location on the shelf 450, the user 5 (FIG. 8) may utilize the user device 110 to send a signal to the control system 100 that the asset 10 has been placed in the appropriate location. Alternatively, the sort location 400 may include a user interface, such as a keyboard, a touchscreen, or the like, that the user 5 may communicate with the control system 100 that the asset 10 has been placed in the appropriate location. In some embodiments, the sort location 400 may include one or more sensors, such as a light sensor, proximity sensor, or the like, configured to detect the presence of an asset 10 within the sort location 400, and the sensors may send a signal to the control system 100 when the asset 10 has been placed into the appropriate location. Additional details in this respect may be understood from U.S. Ser. No. 15/390,109, the contents of which as are incorporated herein by reference in their entirety.

Figure 15A:
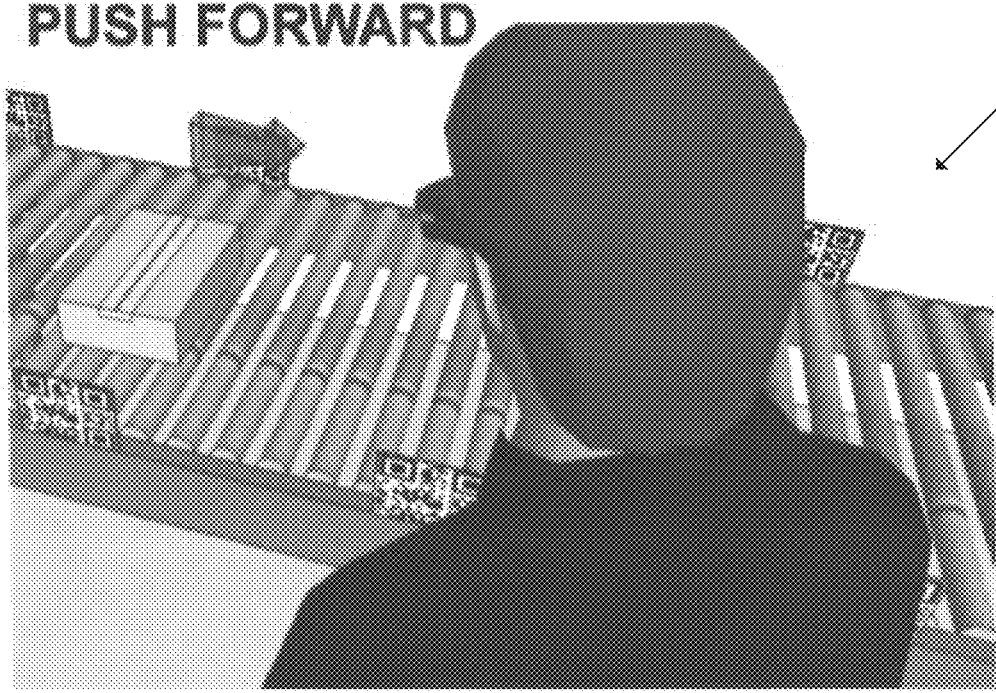
FIGS. 15A-15C are perspective or isometric views of exemplary visual indicators utilized with the improved conveyor belt assembly according to one or more embodiments shown and described herein.
Figure 15B:
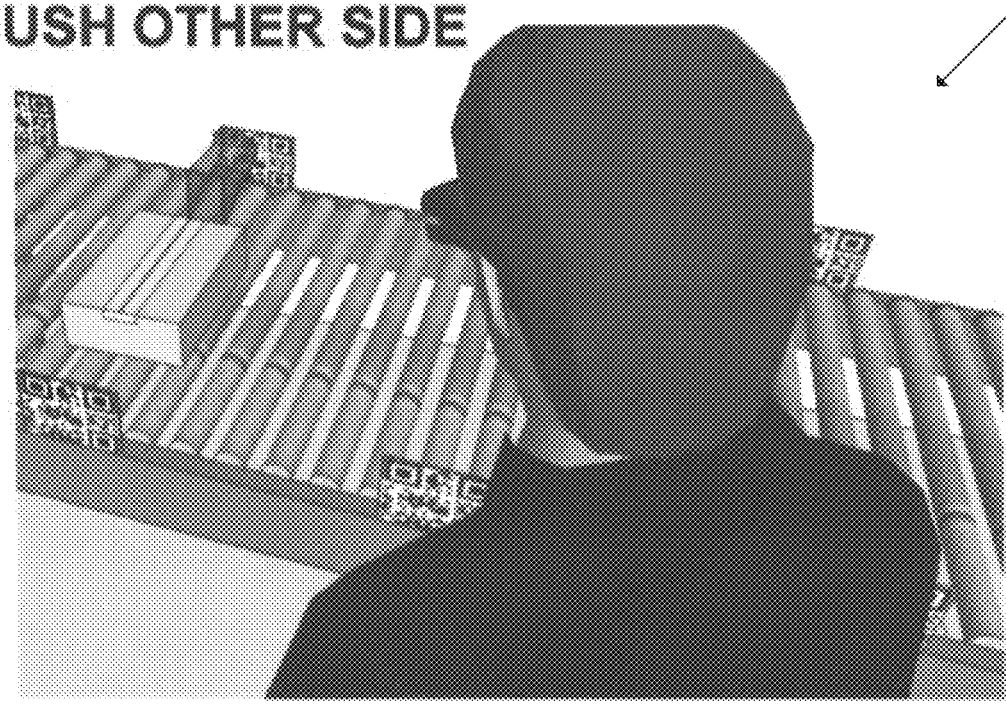
Figure 15C:
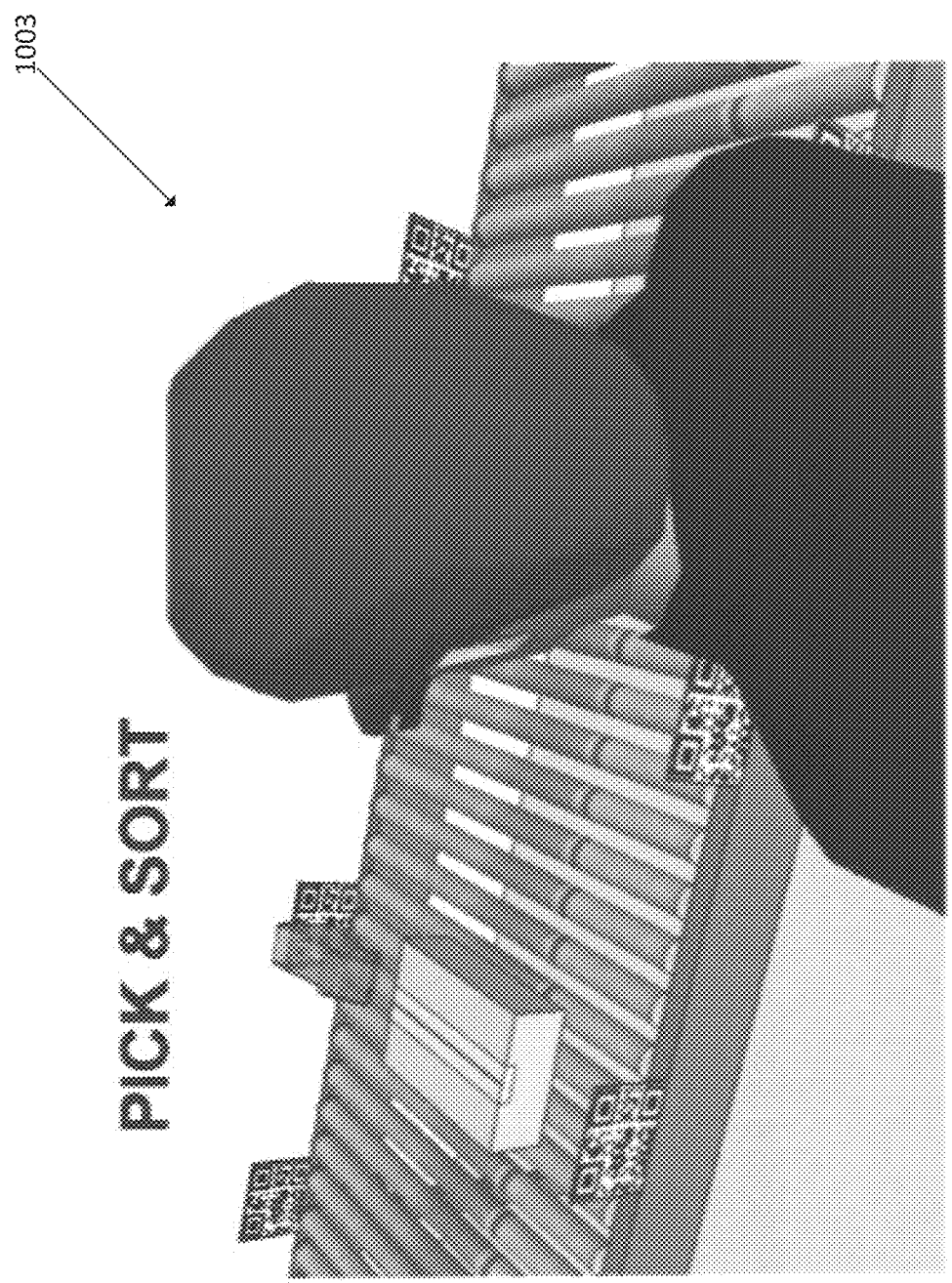

It should be understood that according to various embodiments, the visual indicators 452/810 may be computer-generated and/or overlaid over an augmented reality environment, which may in certain embodiments be displayed to the user via utilized user devices 110 (e.g., glasses worn by the user; see FIG. 4). FIGS. 15A-F illustrate exemplary visual indicators 452/810 that may be utilized. In FIG. 15F, an augmented reality environment 1006, including a conveying mechanism 402/802 and a sort location 400, is displayed. With reference to FIGS. 15A-B, as previously described, certain of the visual indicators 810 generated may convey to a user 5 standing adjacent the conveying mechanism 402/802 a "push forward" (or let pass) indicator 1001 or "push to the other side" indicator 1002, instructing movement of assets 10 not identified for association with and sorting by that particular user. FIG. 15C, in contrast, illustrates an exemplary visual indicator 810 conveying to a user 5 that the asset 10 with which the indicator is associated is selected for "pick and sort" 1003 by that particular user. In the illustrated embodiment of FIG. 15C, the "pick and sort" indicator 1003 is illustrated as being positioned beside the asset; in other embodiments, however (see FIG. 10) the visual indicators 810 may be positioned atop or otherwise substantially overhead of each asset 10.

Figure 15D:
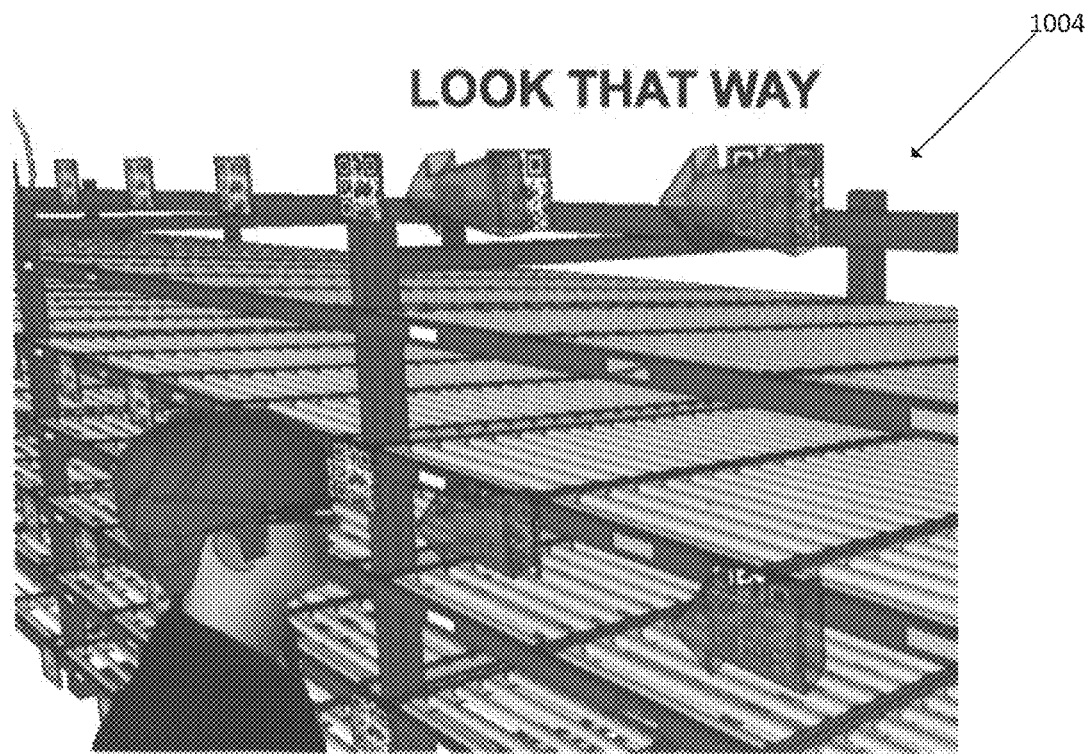
FIGS. 15D-15E are perspective or isometric views of exemplary visual indicators utilized with the sort location according to one or more embodiments shown and described herein.
Figure 15E:
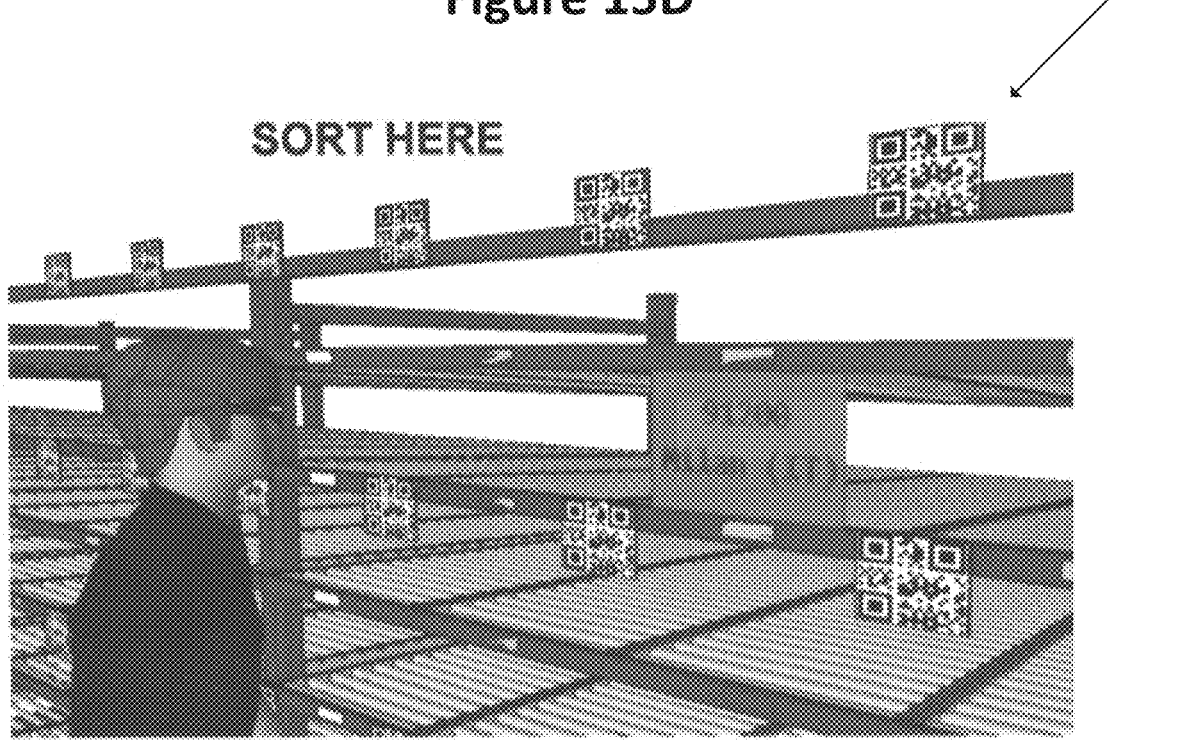
Figure 15F:
FIG. 15F is a perspective or isometric view of exemplary visual indicators utilized in combination with the improved conveyor belt assembly and the sort location according to one or more embodiments shown and described herein.

Relative specifically to the exemplary sort location 400 of FIG. 9, FIGS. 15D-E illustrate exemplary visual indicators 452 that might be overlaid in an augmented reality environment according to various embodiments. FIG. 15D, in particular, illustrates a plurality of "look that way" indicators 1004 that may be configured to guide the user 5 toward the correct sort location for a held asset. FIG. 15E, by way of comparison, illustrates a "sort here" indicator 1005, so as to convey to the user 5 the correct sorting location.

Although FIGS. 15A-F illustrate the various exemplary visual indicators 452/810 therein as red or green arrows and/or a green placard containing some portion of asset data printed thereon (see FIG. 15E), it should be understood that any of a variety of indicators—color or not—may be provided, so long as each are configured to, via the augmented reality (e.g., a mixed reality or hybrid reality) environment 1006 described herein to guide the user 5 utilizing a user device 110 as described herein to the proper sort location for respective assets 10. In at least one embodiment, a floating green sphere that signals the correct location may be provided; in another embodiment, a white frame with green corners that highlight the correct location may be provided. In still other embodiments, any indicator configured to simplistically and succinctly convey correct location data may be utilized.

IV. EXEMPLARY CONTROL SYSTEM CONFIGURATION

In various embodiments, the control system 100 may comprise a plurality of modules, each module configured to perform at least a portion of the functions associated with the methods described herein. For example, the control system 100 may comprise an acquisition module, a sort location module, a matching module, and a notification module. Although described herein as being individual components of the control system 100, the various modules may operate on a combination of one or more devices (e.g., the acquisition/display device 115, the user device 110, the location device 415, and/or the control system 100), such that each device performs the functions of one or more modules.

A. Acquisition Module

In various embodiments, the acquisition module may be configured to obtain asset identifier data and/or conveyor belt data regarding and/or associated with an asset 10 to be sorted. In various embodiments, the asset identifier data may comprise a unique asset identifier such as a tracking number or code, and data defining the one or more appropriate sort locations 400 for the asset 10 as it moves between an origin and a destination, and/or the like. In various embodiments, the conveyor belt data may comprise at least a portion of a unique pattern of colored stripes 808 (see FIG. 16B) provided on the conveying mechanism 802, whereby capture of the unique pattern of colored stripes immediately surrounding (and under) the asset 10 occurs as the asset 10 moves between an origin and a destination, and/or the like.

As a non-limiting example, the acquisition module may be configured to obtain data from the user device 110 (FIGS. 3 and 4) and/or the acquisition device 410 (FIG. 5). In various embodiments, the data received from the user device 110 (FIGS. 3 and 4) and/or the acquisition device 410 (FIG. 5) may include the entirety of the asset identifier data and therefore the acquisition module need only receive asset identifier data from one of the user device 110 (FIGS. 3 and 4) and/or the acquisition device 410 (FIG. 5). However, in various embodiments, the data received from the user device 110 (FIGS. 3 and 4) and/or the acquisition device 410 (FIG. 5) may comprise only a portion of the asset identifier data, and the acquisition module may be configured to obtain the remainder of the asset identifier data from one or more other sources. As a non-limiting example, the acquisition module may be configured to search one or more databases in communication with the control system 100 for asset identifier data corresponding to the data received from the user device 110 (FIGS. 3 and 4) and/or the acquisition device 410 (FIG. 5). The acquisition module may additionally be configured to receive and store at least a portion of the asset identifier data corresponding to the asset 10 that is stored in one or more databases.

In various embodiments, the acquisition module may be configured to transmit at least a portion of the asset identifier data to one or more devices (e.g., the user device 110, the location device 415, the display 420, and/or the control system 100) and/or one or more modules (e.g., the sort location module, the matching module, and/or the notification module). Moreover, upon receiving the asset identifier data regarding an asset 10 to be sorted, the acquisition module may be configured to link or otherwise associate the user device 110 and the asset identifier data. As will be described in greater detail herein, the user device 110 may be associated with the asset identifier data by storing at least a portion of the asset identifier data in a memory associated with the user device 110.

As mentioned, the acquisition module may be configured to, in addition to asset identifier data, also obtain conveyor belt data, the latter comprising a visual image capture of at least a portion of the unique pattern of colored stripes 808 provided on the conveying mechanism 802. In those embodiments that the acquisition module is so configured, the module may be additionally configured to associate the captured portion of the unique pattern of colored stripes 808 with the captured/obtained asset identifier data, such that the asset 10 is associated with or otherwise "assigned to" the captured portion of the pattern. In this manner, as described elsewhere herein, the user device 110 may be configured to recognize only portions of the pattern and therefrom identify an asset associated therewith, as previously captured via the acquisition device 415.

B. Sort Location Module

The sort location module may be configured to receive asset identifier data from the acquisition module. The sort location module is configured to ascertain the appropriate sort location 400 and/or the appropriate position within the sort location 400 for the asset 10 based at least in part on the asset identifier data. In certain embodiments, the sort location module may be configured to determine the appropriate sort location 400 based at least in part on the asset identifier data and sort location data that is associated with the each of the plurality of sort locations 400. The sort location data may be generated based not only upon the asset identifier data, but also upon associated conveyor belt data.

In various embodiments, each of the plurality of sort locations 400 may be identified by sort location data, which may include a unique sort location identifier. The unique sort location identifier may comprise a unique character string individually identifying each of the plurality of sort locations 400. In various embodiments, the sort location data may define any subsequent processing to be performed on assets 10 within each sort location 400, and may comprise the unique sort location identifier for each of the plurality of sort locations 400 the assets 10 will pass through. In various embodiments, the sort location module may determine whether the processing to be performed on assets 10 in each of the plurality of sort locations 400 (as defined in the sort location data) will move the asset 10 closer to its final destination. In various embodiments, the sort location module may determine whether the processing steps to be performed on the assets 10 in each of the sort locations 400 complies with the service level (e.g., Same Day shipping, Next Day Air, Second Day Air, 3 Day Select, Ground shipping, and/or the like) corresponding to the asset 10. As a non-limiting example, the sort location module may determine the appropriate sort location for an asset 10 to be delivered to 123 Main Street, Atlanta, Georgia is a delivery vehicle that will deliver other assets 10 to the same address or nearby addresses (e.g., along the same delivery route). As a second non-limiting example, the sort location module may determine the appropriate sort location for an asset 10 to be delivered to 345 Broad Street, Los Angeles, California via Next Day Delivery is a pallet to be loaded onto a plane destined for Los Angeles, California.

After determining the appropriate sort location 400 and/or the appropriate position for the asset 10 within the sort location 400, the sort location module may be configured to transmit data defining the appropriate sort location 400 and/or the appropriate position for the asset 10 within the sort location 400 to one or more devices (e.g., the user device 110, the display 420, the visual indicator 452, the location device 415, and/or the control system 100) and/or modules (e.g., the matching module and/or the notification module). Additional details in this respect are provided in U.S. Ser. No. 15/390,109, the contents of which as are hereby incorporated by reference in their entirety.

C. Matching Module

The matching module may be configured to receive asset identifier data and/or conveyor belt data from the acquisition module and/or the sort location module, and may be configured to receive data defining the appropriate sort location from the sort location module. Moreover, the matching module may be configured to receive data indicating the user device 110 (and consequently the asset 10) is proximate a first sort location 400. In various embodiments and referring to FIG. 5, the user device 110 and/or one or more location devices 415 may determine that the user device 110 is within a communication area 405 corresponding to the one or more location devices 415, and is therefore proximate to the first sort location 400 corresponding to the one or more location devices 415. As a non-limiting example, each of the one or more location devices 415 may be embodied as a wireless beacon broadcasting a signal indicating the identity of the associated sort location. In various embodiments, each sort location may be associated with a plurality of such location devices 415. The user device 110 may be configured to receive the wireless signals broadcast from the plurality of location devices 415 and determine whether the received signal satisfies one or more signal criteria. For example, the user device 110 may determine whether the signal received from each of the plurality of location devices 415 satisfies a predetermined signal strength threshold and/or may determine whether wireless signals are received from at least a minimum number of location devices 415 broadcasting data regarding a single sort location. Upon a determination that the signal received from the plurality of location devices 415 satisfies each of the signal criteria, the user device 110 may transmit asset identity data and sort location identity data to the matching module to determine whether the user device 110 is proximate the appropriate sort location for the asset.

Upon determining the user device 110 is proximate a first sort location 400, at least one of the user device 110 and the one or more location devices 415 may transmit data indicating the user device 110 is proximate the first sort location 400 to the matching module. The data indicating that the user device 110 is proximate the first sort location 400 may also be indicative of the identity of the first sort location 400 (e.g., the data may comprise the unique sort location identifier corresponding to the first sort location 400). The matching module may be configured to determine whether the first sort location 400 is the appropriate sort location based at least in part on the received data defining the appropriate sort location.

In various embodiments, the matching module may be configured to transmit data indicating whether the first sort location 400 is the appropriate sort location to one or more devices (the user device 110 and/or the one or more location devices 415) and/or one or more modules (e.g., the notification module). For example, upon a determination that the proximate sort location 400 is the appropriate sort location, the matching module may generate and transmit confirmation data to the notification module for additional processing. Alternatively, upon a determination that the proximate sort location 400 is not the appropriate sort location, the matching module may generate and transmit mistake data to the notification module for additional processing.

In various embodiments, the matching module may additionally be configured to link and/or associate the asset identifier data and the sort location identifier data corresponding to the sort location 400 at which the asset is deposited. As a non-limiting example, the asset identifier data may be updated to reflect the link between the asset identifier data and the sort location identifier data. Alternatively, the sort location identifier data may be updated to reflect each of the assets associated with the sort location 400. As described herein, the matching module may be configured to link the asset identifier data and the sort location identifier data upon the occurrence of a triggering event, as will be described in greater detail herein.

To link and/or associate the asset identifier data and the sort location identifier data corresponding to the sort location 400 at which the asset it deposited, the matching module may receive at least a portion of the asset identifier data and at least a portion of the location data and associate these data in, for example, one or more databases. As previously noted, however, the matching module may be configured to associate the asset identifier data and the sort location data by updating at least one of the asset identifier data or the sort location data to reflect the association. Again, the updated data may be stored in one or more databases. Additional details in this respect are provided in U.S. Ser. No. 15/390, 109, the contents of which as are hereby incorporated by reference in their entirety.

D. Notification Module

In various embodiments, the notification module may receive data indicating whether the first sort location 400 is the appropriate sort location from the matching module. As described herein, the notification module may cause one or more alerts to be generated in order to notify the user 5 (e.g., sort personnel) whether the asset 10 should be deposited in the first sort location 400. For example, the notification module may be configured to transmit confirmation data and/or mistake data to the user device 110, the display 420, and/or the one or more location devices 415 in order to cause at least one of the devices to generate an alert discernible by the user 5 (e.g., sort personnel) indicative of the appropriate sort location for the asset 10. To ascertain whether confirmation data and/or mistake data is appropriate for transmission, the user device 110 (and/or sensors associated therewith, e.g., three-dimensional sensors) may be configured to determine not only the position of the asset but also the position of the user's hands (e.g., including not only location, but also gestures), so as to gauge whether or not sorting of the asset is proceeding properly.

In various embodiments, the notification module may cause the user device 110 to display a confirmation message upon a determination that the first sort location 400 is the appropriate sort location. As non-limiting examples, the confirmation message may indicate that the first sort location 400 is the appropriate sort location, or the confirmation message may indicate that an asset has been deposited at the appropriate sort location 400. Alternatively, the notification module may cause a light located near the first sort location 400 to illuminate upon a determination that the first sort location 400 is the appropriate sort location 400. As yet another non-limiting example, the notification module may cause the user device 110 to display a message upon a determination that the first sort location 400 is not the appropriate sort location 400. Similarly, the notification module may cause a light located near the first sort location 400 to illuminate upon a determination that the proximate sort location 400 is not the appropriate sort location. In various embodiments, the notification module may cause one or more sounds to be generated, one or more lights to illuminate, one or more mechanical assemblies to move, and/or other processes discernible by a user 5 to operate and thus indicate to the user 5 whether the first sort location 400 is the appropriate sort location.

Moreover, the notification module may be configured to generate an alert after associating asset identifier data with location data. The notification module may be configured to generate an alert to inform the user 5 (e.g., sort personnel) or other users regarding asset identifier data being associated with location data. As a non-limiting example, the notification module may be configured to cause a message to be displayed via the user device 110 and/or the display 420 in order to notify the user 5 that asset identifier data corresponding to an asset 10 has been associated with location data corresponding to a sort location. Thus, the notification module may facilitate a determination that asset identifier data has been incorrectly associated with location data, and may therefore facilitate the correction of an inappropriate association. For example, based upon the generated alert, the user 5 may determine that the asset identification data was incorrectly associated with a location data corresponding to a first sort location 400. Additional details in this respect are provided in U.S. Ser. No. 15/390,109, the contents of which as are hereby incorporated by reference in their entirety.

According to various embodiments, whether adjacent a sort location 400 or a conveying mechanism 802, the notification module may be configured to generate one or more visual indicators 452/810 to convey sorting instructions to the user 5. It should be understood that according to various embodiments, the visual indicators 452/810 may be computer-generated and/or overlaid over an augmented reality environment, which may in certain embodiments be displayed to the user via utilized user devices 110 (e.g., glasses worn by the user; see FIG. 4). FIGS. 15A-F illustrate exemplary visual indicators 452/810 that may be utilized. In FIG. 15F, an augmented reality environment 1006, including a conveying mechanism 402/802 and a sort location 400, is displayed. With reference to FIGS. 15A-B, as previously described, certain of the visual indicators 810 generated may convey to a user 5 standing adjacent the conveying mechanism 402/802 a "push forward" (or let pass) indicator 1001 or "push to the other side" indicator 1002, instructing movement of assets 10 not identified for association with and sorting by that particular user. FIG. 15C, in contrast, illustrates an exemplary visual indicator 810 conveying to a user 5 that the asset 10 with which the indicator is associated is selected for "pick and sort" 1003 by that particular user. In the illustrated embodiment of FIG. 15C, the "pick and sort" indicator 1003 is illustrated as being positioned beside the asset; in other embodiments, however (see FIG. 10) the visual indicators 810 may be positioned atop or otherwise substantially overhead of each asset 10.

Relative specifically to the exemplary sort location 400 of FIG. 9, FIGS. 15D-E illustrate exemplary visual indicators 452 that might be overlaid in an augmented reality environment according to various embodiments. FIG. 15D, in particular, illustrates a plurality of "look that way" indicators 1004 that may be configured to guide the user 5 toward the correct sort location for a held asset. FIG. 15E, by way of comparison, illustrates a "sort here" indicator 1005, so as to convey to the user 5 the correct sorting location.

Additionally, although FIGS. 15A-F illustrate the various exemplary visual indicators 452/810 therein as red or green arrows and/or a green placard containing some portion of asset data printed thereon (see FIG. 15E), it should be understood that any of a variety of indicators—color or not—may be provided, so long as each are configured to, via the augmented reality environment 1006 described herein to guide the user 5 utilizing

V. EXEMPLARY SYSTEM OPERATION

A. Exemplary Acquisition Device Operation

FIGS. 5, 10, and 15F illustrate an exemplary environment in which assets 10 are moved from an intake location 450 (e.g., an unsorted location) to one or more sort locations 400. In various embodiments, a user 5 (e.g., sort personnel) may utilize a user device 110 as described herein while transporting assets 10 from an intake location 450 to one or more sort locations 400. As described herein, the user device 110 may be configured for receiving information regarding a particular asset 10 to be sorted, and for informing the user 5 whether the asset 10 is being sorted to the appropriate sort location.

Figure 11:
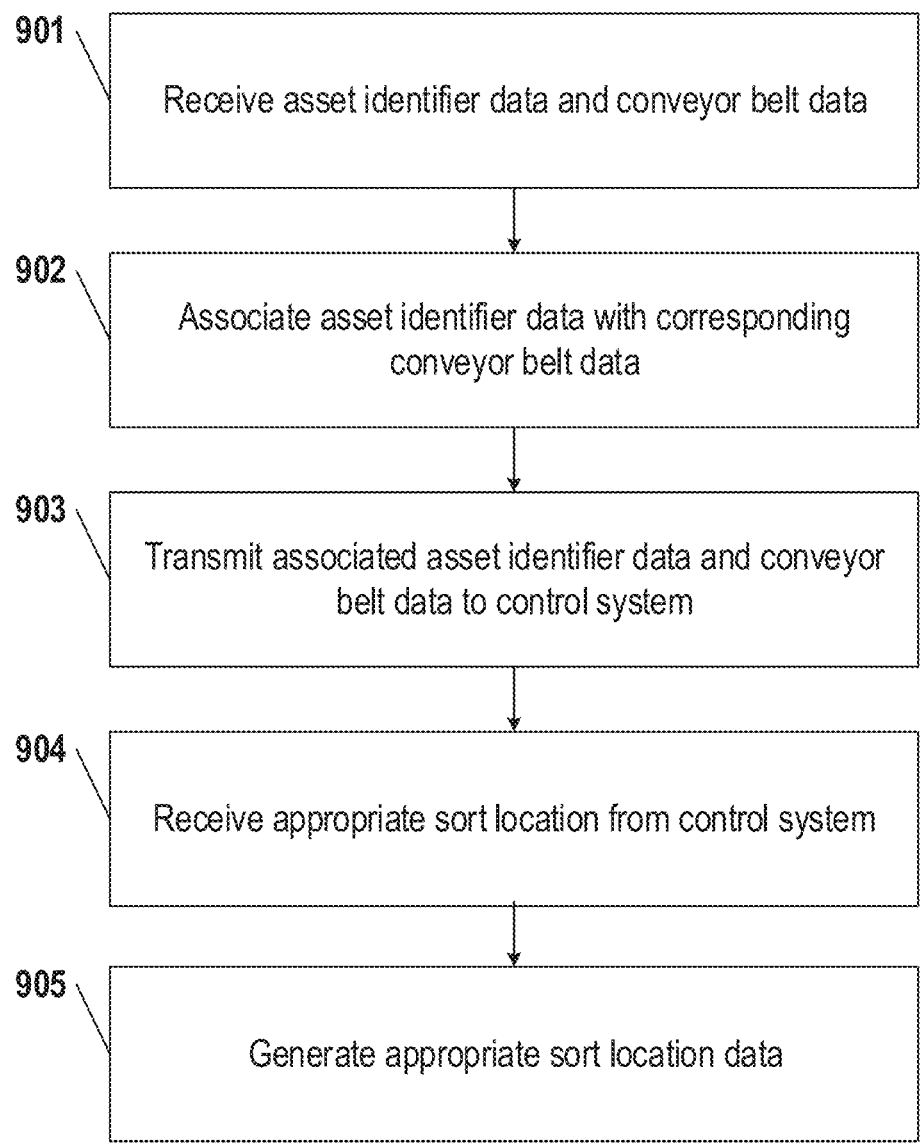

FIG. 11 illustrates exemplary steps carried out by the acquisition device 115 according to various embodiments of the present invention. As illustrated in FIG. 11, the acquisition device 115 may be configured to receive at Block 901 asset identifier data associated with an asset 10 to be sorted and conveyor belt data related to a unique pattern of colored stripes 808 adjacent and/or surrounding the asset on the conveying mechanism 802. In various embodiments, the acquisition device 115 may scan, read, image, or otherwise obtain/capture the asset identifier data from the asset 10; the conveyor belt data may be obtained generally via an imaging capability within the acquisition device, as previously described herein.

As noted herein, the asset identifier data may be printed or otherwise affixed to the asset 10 to be sorted. In various embodiments, the user device 110 and/or the acquisition device 410 may receive asset identifier data by, for example, reading an RFID tag associated with the asset 10, reading a bar code, QR code, character string, and/or symbol printed on the asset 10 or otherwise associated with the asset 10, and/or otherwise obtaining asset identifier data regarding the asset 10 to be sorted. The user device 110 may be configured to store the asset identifier data in a memory associated with the user device for later retrieval and use.

As noted above, in various embodiments, the asset identifier data may comprise a unique asset identifier, such as a tracking code or other unique identifier. Alternatively or additionally, the asset identifier data may comprise origin identifying data (e.g., origin address, shipper identity, and/or the like), destination identifying data (e.g., destination address, recipient identity, and/or the like), service level data (e.g., Same Day shipping, Next Day Air, Second Day Air, 3 Day Select, Ground shipping, and/or the like), and/or the like. As described above, the asset identifier data may additionally include indications designating an asset 10 for special or expedited handling. Moreover, in various embodiments, the asset identifier data may comprise more detailed data regarding the asset 10 to be sorted, such as sort locations 400 for each intermediate shipping point. In various embodiments, the asset identifier data may be updated at various times during the shipping process. For example, after determining an appropriate sort location 400 for the asset 10 to be sorted (a process described in greater detail herein), the asset identifier data may be updated to reflect the appropriate sort location 400. The asset identifier data 400 may additionally be updated to reflect the appropriate position of the asset 10 within the sort location 400. Alternatively, the asset identifier data may be fixed after being created, such that it is not updated with new and/or alternative information during shipment.

As noted above, in various embodiments, the conveyor belt data may comprise a unique pattern of colored stripes 808 (see also FIG. 16B) that may be provided upon the conveying mechanism 802. In certain embodiments, the unique pattern may be generated via utilization of a color spectrum 806 containing at least seven distinct colors 806A-806G. By providing, for example, seven distinct colors, certain embodiments provide over 200 unique permutations (where groupings of colors are limited to three stripes, as detailed previously herein) that may be readable by the user device 110 at a distance of up to 94 meters (although such distance is typically not necessary). In this manner, though, the various embodiments provided herein eliminate the need for a user 5 utilizing the user device 110 to have to physically position themselves very close to the conveying mechanism 802 so as to be able to scan, read, or otherwise capture specific asset identifier data from each respective asset 10. Instead, from further distances, the user device 110 may capture only monitor for and recognize unique patterns of stripes on the conveying mechanism 802, whereby upon recognition thereof (as detailed elsewhere herein) sort location data may be generated without any scan of asset identifier data by the user device 110.

FIG. 16B illustrates an exemplary conveying mechanism 802 having thereon a unique pattern of colored stripes 808. Subsets thereof (see 808A-808H) are also unique and may comprise sets of three, four, or even more consecutive stripes, as detailed elsewhere herein. At least a portion of the unique pattern 808—typically at least one of the subsets thereof (e.g., one of 808A-808H, whether a set of three or four or more stripes)—is that which is captured by the acquisition device in Block 901. Specifically captured is that subset of the unique pattern (which is also unique as a subset) that is surrounding (i.e., adjacent to and passing underneath) the asset 10 for which asset identifier data is received Returning now to FIG. 11, in Block 902, which the above-detailed combination of asset identifier data and conveyor belt data, the acquisition device 115 proceeds to associate or otherwise somehow assign or correlate the asset identifier data with conveyor belt data corresponding thereto (i.e., conveyor belt data surrounding, adjacent to and passing underneath, the location of the asset 10 on the conveying mechanism 802). This associated set of data (asset and conveyor belt related alike) is transmitted to the control system 100 in Block 903. In certain embodiments, the associated set of data may be transmitted directly from the acquisition device to the user device; however, in other embodiments—for example where multiple user devices may be being utilized, transmission first to the control system enables proper redistribution thereof via the control system, which may be centralized.

In certain embodiments wherein the acquisition device 115 includes not only an acquisition element 410 but also a display element 420, the acquisition device 115 may be further configured to execute Blocks 904 and 905. In at least these embodiments, upon receipt of appropriate sort location from the control system in Block 904, the acquisition device may be configured to generate appropriate sort location data in Block 905 for display to a user 5. Such sort location data may be computer-generated in the form of indicators or notifications, considering for example the visual indicators 452/810, along with those indicators 1001-1005 illustrated in FIGS. 15A-E. In other embodiments, however, the acquisition device 115 need not execute Blocks 904/905, as the augmented reality environment—and the visual indicators and/or associated notifications (visual, audible, or the like)—are generated at each user device 110 and not at the acquisition device 115 (or more specifically any display element 420 thereof).

B. Exemplary User Device Operation

FIGS. 5, 10, and 15F illustrate an exemplary environment in which assets 10 are moved from an intake location 450 (e.g., an unsorted location) to one or more sort locations 400. In various embodiments, a user 5 (e.g., sort personnel) may utilize a user device 110 as described herein while transporting assets 10 from an intake location 450 to one or more sort locations 400. As described herein, the user device 110 may be configured for receiving information regarding a particular asset 10 to be sorted, and for informing the user 5 whether the asset 10 is being sorted to the appropriate sort location.

Figure 12:
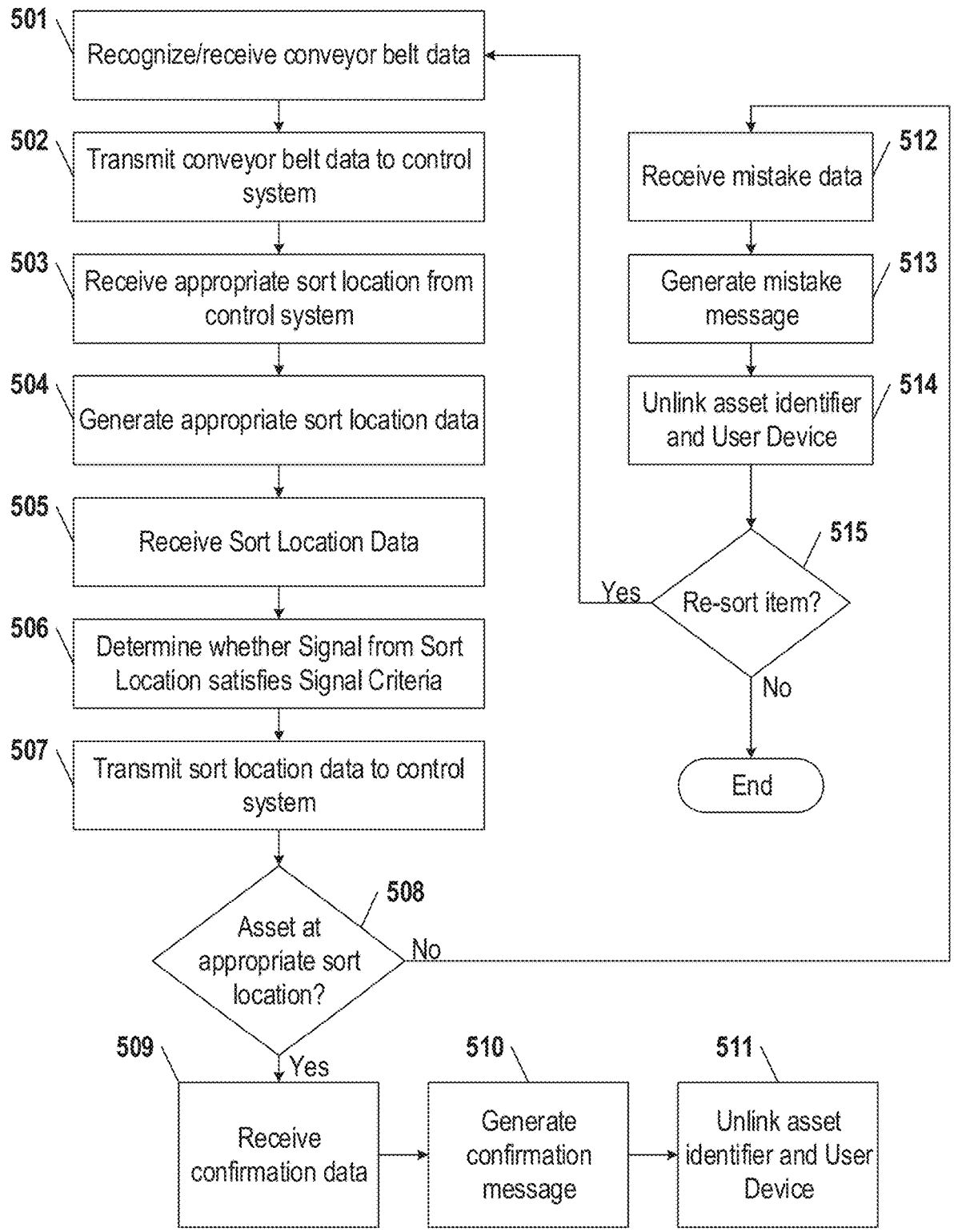

FIG. 12 illustrates exemplary steps carried out by the user device 110 according to various embodiments of the present invention. As illustrated in FIG. 11, the user device 110 may be configured to monitor and capture conveyor belt data associated with an asset 10 (yet to be identified) to be sorted at Block 501. In various embodiments, the user 5 may utilize an imaging component of the user device 110 to capture conveyor belt data—specifically a portion of the unique pattern of colored stripes, the portion or subset thereof also being unique, as described elsewhere herein—surrounding (e.g., adjacent and passing under) the asset 10. In Block 502 the user device 110 transmits the captured conveyor belt data to the control system 100, and in response receives in Block 503 from the control system appropriate sort location. As described elsewhere herein, the control system 100 is able to return the appropriate sort location in Block 503 due to an association made between the conveyor belt data and the asset identifier data captured by the acquisition device 115 upstream of the user's utilization of the user device 110 (see FIGS. 5 and 10).

In Block 504 of FIG. 12, the user device 110 is configured to generate appropriate sort location data. Alternatively or additionally, as previously described herein, a display element 420 of the acquisition device may be configured to inform the user 5 of the appropriate sort location 400 for a particular asset 10 at Block 904. In those embodiments, though, where the user device 110 is user-worn, generation of appropriate sort location data occurs thereon, so as to provide a user-perspective augmented reality environment.

As a non-limiting example, the user device 110 may cause display of the appropriate sort location via the display 114 to the user 5 (e.g., sort personnel) or may audibly inform the user 5 of the appropriate sort location for the asset 10. In one embodiment, the display 114 of the user device 110 (e.g., glasses) may display an indication of the appropriate sort location 400 shown superimposed over or positioned proximate to the asset 10. For example, upon receiving the appropriate sort location 400 from the control system 100, the user device 110 may display an indication of the sort location 400 on the display 114. In such embodiments, the user device 110 may display the indication of the sort location 400 on the display 114 regardless of the FOV of the user device 110. Alternatively, in some embodiments, the presentation of the indication of the sort location 400 on the display 114 may be dependent upon a detected FOV of the user device 110. For example, as described above, the user device 110 may detect an asset 10 within its FOV. Upon detecting an asset 10 within the FOV of the user device 110, the local computer 120 of the user device 110 may generate an augmented reality (AR) image or layer for presentation on the display 114. The AR image or layer may be based on the detection of the asset 10 by the user device 110 and the received appropriate sort location 400 from the control system 100. The user device 110 may then display the AR image or layer on the display 114 such that the sort location 400 is overlaid over or positioned proximate to the asset 10 when the asset 10 is within the FOV of the user device 110.

In embodiments including the display 420 (FIG. 5), the indication of the appropriate sort location may be shown on the display 420 and/or projected onto the asset 10. The displayed sort location 400 may comprise a sort location identifier, such as a symbol, character string, and/or the like. Additionally, in various embodiments, information indicative of the appropriate sort location may be printed on the asset 10 (e.g., directly onto a surface of the asset 10, onto a sticker or other label secured to the asset 10, and/or the like). In various embodiments, the user device 110 and/or the display 420 may not display the appropriate sort location for the asset 10, and accordingly the user 5 may rely on the information printed on the asset 10 to determine the appropriate sort location. Accordingly, in such embodiments, after receiving asset identifier data as illustrated in Block 501 of FIG. 10, the user device may be configured to thereafter await receipt of sort location data as illustrated in Block 505. Additional details in this respect may be understood with reference to U.S. Ser. No. 15/390,109, the contents of which as are hereby incorporated by reference in their entirety.

Returning momentarily to Blocks 501-504 collectively, although described previously herein as a process whereby the user device 110 captures conveyor belt data and transmits that to the control system, so as to receive back from the control system an appropriate sort location, in certain embodiments, depending upon local storage and memory capacities of the user device, Block 502 may be eliminated. In at least these embodiments, the user device 110 may receive sort location data, asset identifier data, and conveyor belt data periodically (or in a near real-time manner) from the control system 100 without having to request any of the same (i.e., by transmission of conveyor belt data). In this manner, the user device 110 may be configured to simply monitor the conveying mechanism 802 and upon identification thereon of a unique pattern of colored stripes 808, determine locally whether each iteratively recognized pattern is associated (as previously done via the control system 100) with a particular asset 10. If so, the user device flow proceeds to Block 504, generating appropriate sort location data based upon that data previously transmitted by the control system to the user device.

Turning now to Block 505, the user 5 (e.g., sort personnel) may transport the asset 10 and the user device 110 to a sort location 400. As the user 5 nears the sort location 400 (e.g., enters the communication area 405 corresponding to the sort location 400), the user device 110 may establish a wireless communication connection with one or more location devices 415 associated with the sort location 400 and receive sort location data from the one or more location devices 415 at Block 505. As the user device 110 is moved proximate the sort location, the user device 110 receives the signals broadcast by one or more of the location devices 415 at Block 505. At Block 506 the user device 110 may determine whether the received signals satisfy one or more signal criteria in order to validate the identity of the proximate sort location. For example, the user device 110 may determine whether the signal strength received from each of the one or more location devices 415 satisfies a predetermined signal strength threshold (e.g., the signal strength threshold may define a minimum signal strength). Moreover, the user device 110 may determine whether a signal is received from a minimum number of location devices 415 associated with a particular sort location. As yet another example, the user device 110 may determine whether a signal indicating that the user device is proximate to sort location 400 from at least 3 location devices 415 each broadcasting the identity of the sort location 400. In various embodiments, the user device 110 may determine whether two or more signal criteria are satisfied (e.g., the signal strength threshold and the minimum number of location devices 415). Such criteria may impede false positive determinations that the user device 110 is proximate a particular sort location. Additional details in this respect may be understood with reference to U.S. Ser. No. 15/390,109, the contents of which as are hereby incorporated by reference in their entirety.

Upon determining that the signals received by the user device 110 satisfy the one or more signal criteria, the user device 110 may transmit the sort location identity data received from the one or more location devices 415 and the asset identity data to the control system 100 at Block 506. The control system 100 may then determine whether the user device 110 is proximate the appropriate sort location for the asset. The control system 100 may be configured to transmit an indication of whether the user device 110 is proximate the appropriate sort location to the user device 110.

Alternatively, after the user device 110 enters the communication area 405, the user device 110 may be configured to transmit the asset identifier to the location devices 415. In various embodiments wherein the asset identifier data comprises data regarding the appropriate sort location for the asset 10, the location devices 415 may be configured to transmit data indicating whether the user device 110, and consequently the user 5 and asset 10, is proximate the appropriate sort location (e.g., within the communication area 405) to the user device 110. In various embodiments, the one or more location devices 415 may be configured to transmit at least a portion of the asset identifier data to the control system 100, which may be configured to determine whether the user device 110 is proximate the appropriate sort location. The control system 100 may be configured to transmit an indication of whether the user device 110 is proximate the appropriate sort location to the one or more location devices 415, which may be configured to transmit an indication of whether the user device is proximate the appropriate sort location to the user device 110. Additional details in this respect may be understood with reference to U.S. Ser. No. 15/390,109, the contents of which as are hereby incorporated by reference in their entirety.

Referring again to FIG. 8, upon a determination that the user device 110 is proximate an incorrect sort location 400 (e.g., within a communication area 405 corresponding to a final delivery vehicle that does not travel to the asset's 10 destination address) at Block 508, at least one of the control system 100 and/or the one or more location devices 415 may be configured to transmit mistake data to the user device 110, and the user device 110 may be configured to receive the mistake data at Block 512. Upon receiving the mistake data, the user device 110 may be configured to generate a mistake message to inform the user 5 (e.g., sort personnel) that the asset 10 is proximate an incorrect sort location 400 at Block 513. Alternatively or additionally, the display 420 may be configured to display a mistake message to inform the user 5 that the asset 10 is proximate to an incorrect sort location 400 at Block 513. Additional details in this respect may be understood with reference to U.S. Ser. No. 15/390,109, the contents of which as are hereby incorporated by reference in their entirety.

Thus, as a non-limiting example, mistake data may be generated if the user 5 approaches an incorrect sort location and/or enters an incorrect sort location. As indicated at Block 514, the user device 110 may unlink the asset identifier data and the user device 110 such that the asset identifier data is cleared from the memory of the user device 110 such that the asset identifier data is no longer stored in the memory of the user device 110 upon the occurrence of a triggering event. Such triggering event may be, for example, reading, scanning, or otherwise receiving asset identifier data (e.g., via the indicia reader device) while the user device 110 is in the communication area 405, losing connection between one or more location devices 415 and the user device 110 (e.g., upon a determination that the wireless communication connection between the plurality of location devices 415 and the user device 110 no longer satisfy the signal criteria), after receiving asset identifier data regarding a second asset 10, and/or otherwise after a triggering event. In various embodiments, the user device 110 may be configured to reset, or otherwise dissociate the asset identified data from the user device 110 upon the occurrence of a triggering event. Accordingly, in the event that the user device 110 is located proximate an incorrect sort location, the user may be required to rescan the indicia associated with the asset 10 to relink the asset identified data with the user device 110 before transporting the asset 10 to the appropriate sort location. This may be associated further with a re-sort of the item or asset 10 in Block 515, for which additional details in this respect may be understood with reference to U.S. Ser. No. 15/390,109, the contents of which as are hereby incorporated by reference in their entirety.

Referring again to Block 508, the process may proceed after transmission of the asset identifier data and/or sort location identifier data to the one or more location devices 415 and/or control system 100 (illustrated as Block 507) with reference to Blocks 509-511 if the user 5 approaches the appropriate sort location. Upon a determination that the user device 110 is proximate and/or within the appropriate sort location (e.g., within the communication area 405 corresponding to the appropriate sort location), the control system 100 and/or the one or more location devices 415 may be configured to transmit confirmation data to the user device 110 indicating the user device 110 is proximate the appropriate sort location for the asset 10, and the user device 110 may be configured to receive the confirmation data at Block 509. Upon receiving the confirmation data, the user device 110 may be configured to generate a confirmation message to inform the user 5 (e.g., sort personnel) that the asset 10 is near the appropriate sort location 400 at Block 510. Alternatively or additionally, the display 420 may be configured to display a confirmation message to inform the user 5 that the asset 10 is near the appropriate sort location 400 at Block 510. As a non-limiting example, the user device 110 may be configured to cause display of a confirmation message via the display 114, emit a confirmation sound, and/or otherwise provide the user 5 with confirmation that the user device 110 is proximate the appropriate sort location.

In various embodiments, after receiving the confirmation data, the user device 110 may be configured to associate the asset identifier data with a sort location identifier. Alternatively, the asset identifier data may be transmitted to the control system 100, which may be configured to associate the asset identifier data with the sort location data.

After receiving the confirmation data and/or after another triggering event, the user device 110 may be configured to dissociate, unlink, delete, clear, or otherwise remove the asset identifier data regarding the recently sorted asset 10 from the active memory of the user device 110 at Block 511. The user device 110 may be configured to unlink the asset identifier data after the user device 110 determines that the one or more signal criteria are no longer satisfied, after a predetermined amount of time after receiving the confirmation data; after scanning, reading, or otherwise receiving the asset identifier data regarding the asset 10 (e.g., via the indicia reader) while the user device 110 is located within the communication area 405; after receiving asset identifier data regarding a second asset 10; after receiving user input via the user device 110; and/or otherwise after a triggering event. The user device 110 may be utilized to receive asset identifier data regarding a subsequent asset 10 to be sorted, and the process may be repeated.

The user device 110 may have any of a variety of configurations. For example, the user device 110 may not transmit or receive data (e.g., asset identifier data) from the control system 100, and may instead only transmit and receive data from one or more location devices 415. Moreover, the user device 110 may not generate and/or display appropriate sort location data, and instead the user 5 (e.g., sort personnel) may be required to ascertain the appropriate sort location for an asset 10 without a reminder or other indication from the user device 110. Alternatively, the appropriate sort location may be printed on the asset 10 in human readable form such that the user 5 (e.g., sort personnel) may determine the appropriate sort location based on information printed on or otherwise physically associated with the asset 10.

As yet another alternative, the user device 110 need not establish a new connection with one or more proximate location devices 415 each time the user device enters a connection area 405. In various embodiments, the user device 110 may be configured to associate the asset identifier data and the location data prior to a determination whether the first sort location 400 is the appropriate sort location for the asset 10. Alternatively, the user device 110 may be configured to associate the asset identifier data and the location data without determining whether the first sort location 400 is the appropriate sort location for the asset 10. The user device 110 may be further configured to generate one or more alerts regarding the association between the asset identifier data and the location data. The user device 110 may be configured to generate an alert to inform the user 5 (e.g., sort personnel) or other users regarding asset identifier data being associated with location data. Additional details in this respect and otherwise related to the user device 110 operation relative to a particular sort location 400 may be understood with reference to U.S. Ser. No. 15/390,109, the contents of which as are hereby incorporated by reference in their entirety.

C. Exemplary Location Device Operation

In various embodiments, each sort location may be associated with a plurality of location devices 415 embodied as wireless beacons each configured to broadcast data indicative of the identity of the associated sort location 400 such that the user device 110 may receive such broadcast data. Accordingly, each location device 415 may be configured to establish a one-way communication connection with a user device 110 such that each of the location devices 415 may transmit data, but not receive data from the user device 110. For example, each location device 415 may be configured to transmit data indicative of the identity of the sort location 400 to the user device 110 upon the user device entering the broadcast area of the location device 415. The user device 110 may then be configured to transmit the sort location identity data and/or the asset identity data indicative of the identity of the asset being transported by the user to the control system 100 for additional processing.

Figure 13:
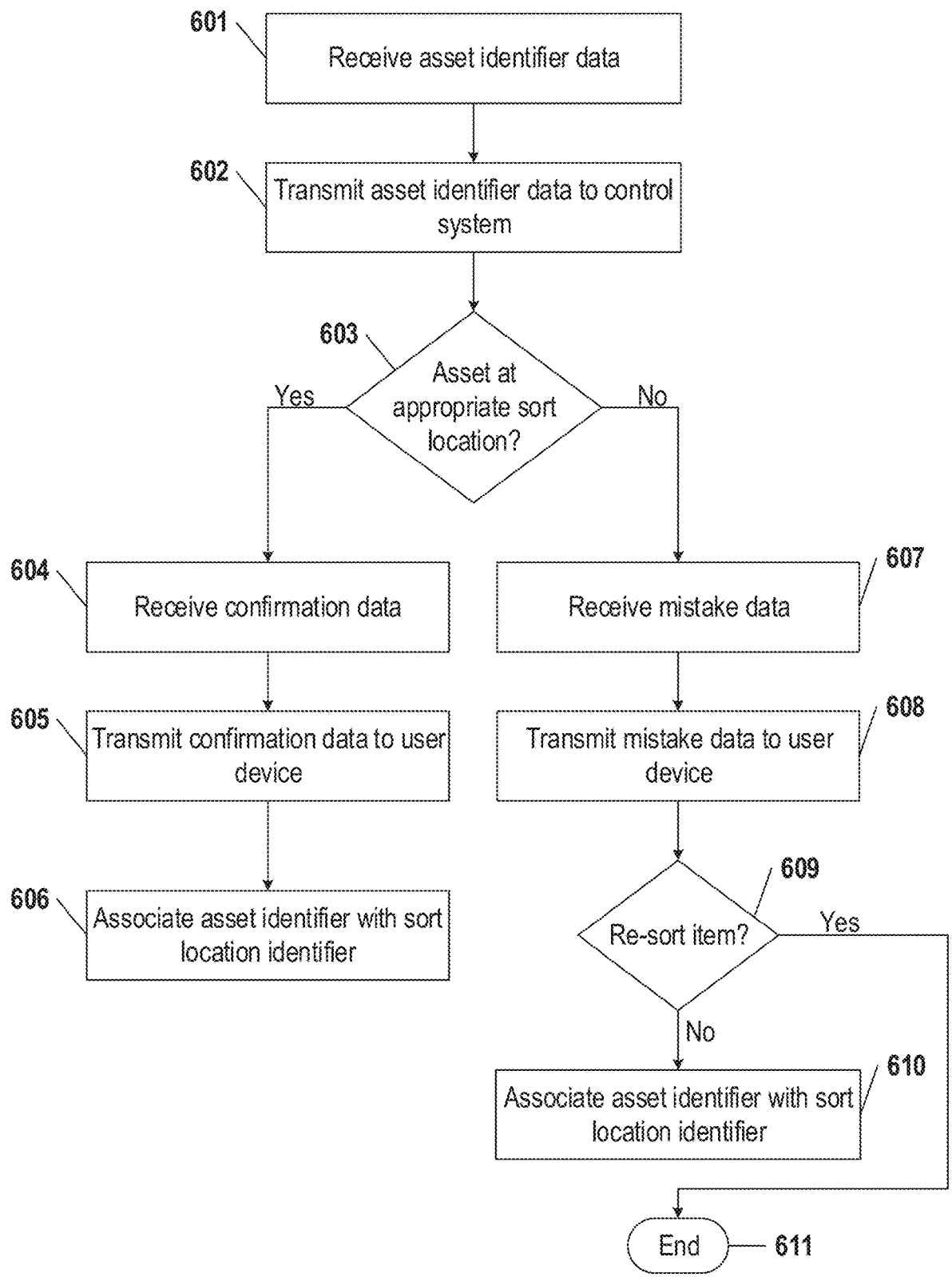

Alternatively, each location device 415 may be configured to transmit and/or receive data from the user device 110 and/or the control system 100. FIG. 13 illustrates exemplary steps carried out by a location device 415 according to various embodiments of the present invention. As illustrated in FIG. 13, each location device 415 may receive asset identifier data at Block 601. The asset identifier data may be transmitted to one or more location devices 415 from a user device 110. Additional details in this respect may be understood with reference to U.S. Ser. No. 15/390,109, the contents of which as are hereby incorporated by reference in their entirety.

In various embodiments, the location device 415 may be configured to transmit at least a portion of the received asset identifier data to the control system 100 at Block 602. The control system 100 may be configured to determine the appropriate sort location for the asset 10 based at least in part on the asset identifier information received from the location device 415. Alternatively, the location device 415 may be configured to determine whether the sort location 400 associated with the location device is the appropriate sort location for the asset 10. Additional details in this respect may be understood with reference to U.S. Ser. No. 15/390,109, the contents of which as are hereby incorporated by reference in their entirety.

As indicated at Block 603, the remaining steps to be completed may be selected based at least in part on a determination of whether the location device 415 corresponds to the appropriate sort location 400. Upon a determination that the sort location 400 associated with the location device 415 is not the determined appropriate sort location, the location device is configured to receive mistake data at Block 607. At Block 608, the location device 415 may be configured to transmit the mistake data to the user device 110 (see also FIG. 15D). The user 5 (e.g., sort personnel) may then continue transporting the asset 10 (and consequently the user device 110) to another sort location 400 at Block 609, and the process ends at Block 611. Additional details in this respect may be understood with reference to U.S. Ser. No. 15/390,109, the contents of which as are hereby incorporated by reference in their entirety.

Referring again to Block 603, the process may proceed after transmission of the asset identifier data to the control system 100 (illustrated as Block 602) with reference to Blocks 604–606 if the user 5 approaches the appropriate sort location (see also FIG. 15E). Upon a determination that the sort location 400 associated with the location device 415 is the appropriate sort location, the location device may be configured to receive confirmation data at Block 604. As indicated herein, the confirmation data may indicate that the user device 110 is proximate the appropriate sort location.

At Block 605, the location device 415 may be configured to transmit the confirmation data to the user device 110 and/or the display 420. As indicated herein, the user device 110 and/or the display 420 may be configured to generate an indication discernible by the user 5 that the proximate sort location 400 (i.e., the sort location 400 associated with the location device 415) is the determined appropriate sort location for the asset 10 (see again, FIG. 15E). The user 5 (e.g., sort personnel) may then deposit the asset 10 at the appropriate sort location. At Block 606, the location device 415 may associate the asset identifier data with sort location identifier data upon the occurrence of a triggering event. As non-limiting examples, the triggering event may be the expiration of a predetermined amount of time after receiving or generating confirmation data, the reception of asset identifier data while the user device 110 is within the communication area 405, the reception of user input via the user device 110, and/or the like.

The location device 415 may have any of a variety of different configurations. Additional details in this respect may be understood with reference to U.S. Ser. No. 15/390, 109, the contents of which as are hereby incorporated by reference in their entirety.

D. Exemplary Control System Operation

Figure 14:
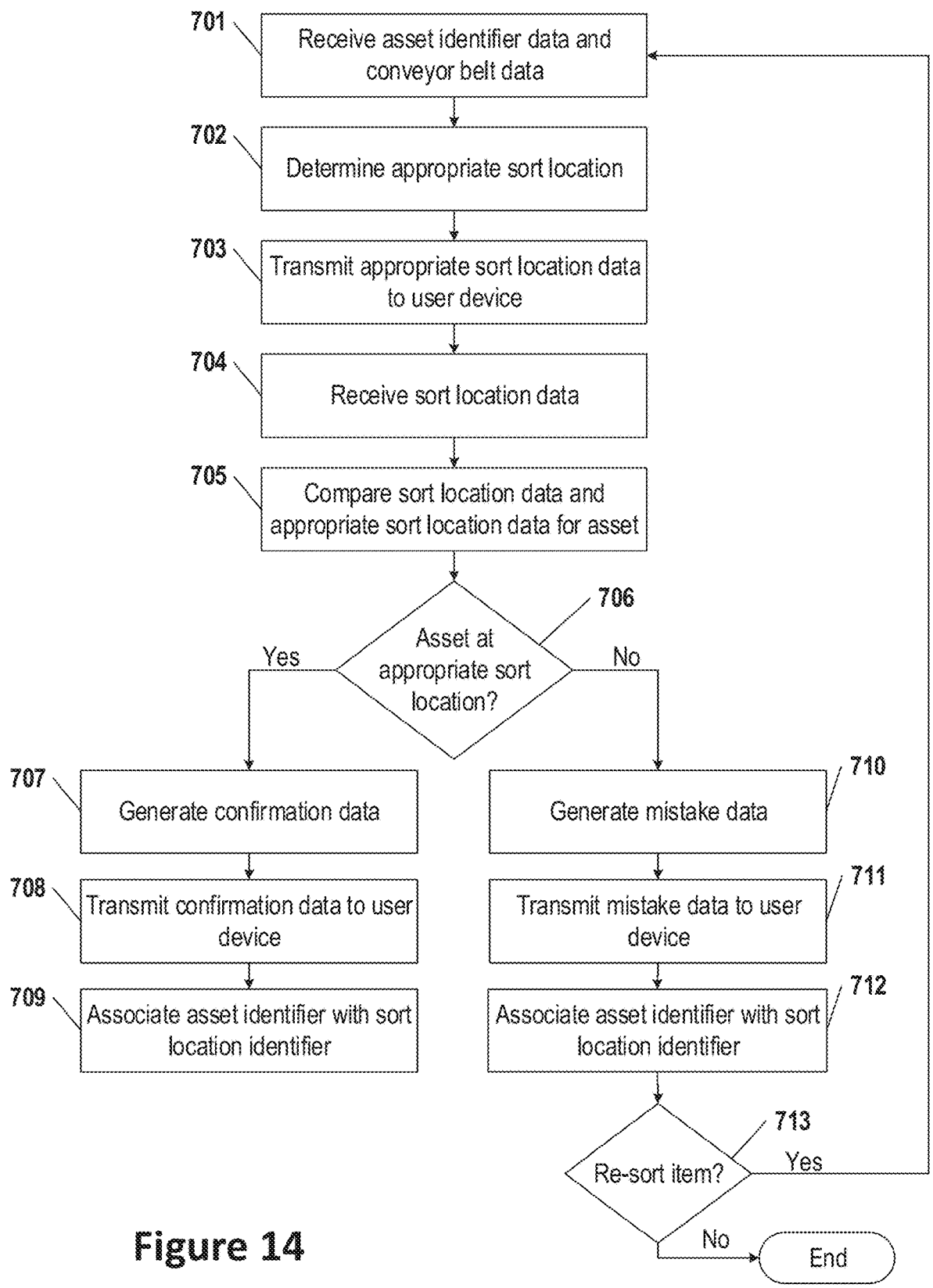

FIG. 14 illustrates exemplary steps carried out by the control system 100 according to various embodiments of the present invention. As illustrated in FIG. 14, the control system 100 may receive asset identifier data and conveyor belt data at Block 701. As indicated herein, the asset indicator data may be received from the user device 110, the acquisition device 115, and/or the one or more location devices 415. The conveyor belt data (e.g., the imaging of unique portions of the pattern of colored stripes 808 on the conveying mechanism 802 (see FIGS. 10 and 16B)) may be received from the user device 110 and/or the acquisition device 115.

Further details regarding the scope and contents of the asset identifier data and the conveyor belt data have been described previously herein. Relative to the asset identifier data, still additional details in this respect may be understood with reference to U.S. Ser. No. 15/390,109, the contents of which as are hereby incorporated by reference in their entirety.

At Block 702, the control system 100 may be configured to determine the appropriate sort location 400 for the asset 10 and/or the appropriate position within the sort location 10 for the asset 10. In various embodiments, the determination of the appropriate sort location for the asset 10 may be based at least in part on the received asset identifier data. Moreover, the control system 100 may utilize sort location data corresponding to each of the sort locations 400 to determine whether any subsequent processing to be performed on assets 10 at each sort location 400 will move the asset 10 closer to its final destination. As a non-limiting example, the control system 100 may determine the appropriate sort location for an asset 10 to be delivered to 123 Main Street, Atlanta, Georgia is the delivery vehicle that will deliver other assets 10 to 123 Main Street, Atlanta, Georgia. Additional details in this respect may be understood with reference to U.S. Ser. No. 15/390,109, the contents of which as are hereby incorporated by reference in their entirety.

Referring again to FIG. 14, at Block 703 the control system 100 may be configured to transmit data identifying the appropriate sort location to the user device 110. As noted herein, the user device 110 and/or the display 420 may be configured to generate an indicator (e.g., visual indicators 452/810) discernible by the user 5 (e.g., sort personnel)

regarding the appropriate sort location for the asset 10. However, as noted herein, each asset 10 may have information indicative of an appropriate sort location printed thereon, and accordingly the control system 100 may not transmit appropriate sort location data to the user device 110 and/or the display 420 for display to the user 5.

In certain embodiments, the sort location data transmitted in Block 703 by the control system 100 may be associated not only with the asset 10 but also the unique pattern of colored stripes 808 received and associated therewith (e.g., as may be received from the acquisition device 115, as detailed elsewhere herein). In these and other embodiments, the sort location data may be configured to facilitate identification of the asset 10 by a user 5 via use of the user device 110 only monitoring and recognizing the unique pattern of colored stripes 808 on the conveying mechanism 802. Stated otherwise, in certain embodiments, the user device 110 need not obtain or otherwise scan asset identifier data directly, so as to enable utilization of user-worn (e.g., glasses) devices 110 from further distances relative to the assets 10 (and in particular a label thereon containing the asset identifier data).

The control system 100 may also be configured to receive sort location data from the user device 110 and/or the location device 415 upon the user device entering the communication area 405 corresponding to the location device 415 at Block 704. At Block 705, the control system 100 may subsequently compare the appropriate sort location and the sort location data received at Block 704 to determine whether the user device 110 is proximate the appropriate sort location. As indicated at Block 706, the remaining steps to be completed may be selected based at least in part on a determination of whether the location device 415 corresponds to the appropriate sort location. Additional details in this respect may be understood with reference to U.S. Ser. No. 15/390,109, the contents of which as are hereby incorporated by reference in their entirety.

Upon a determination that the user device 110 is proximate an incorrect sort location 400, the control system 100 may generate mistake data at Block 710. Upon generating the mistake data, the control system 100 may transmit the mistake data to the user device 110, the display 420, and/or the location device 415 at Block 711. As indicated herein, the user device 110, the display 420, and/or the location device 415 may be configured to generate a message discernible by the user 5 (e.g., sort personnel) indicating the user device 110 is proximate an incorrect sort location 400 (see FIG. 15D). In various embodiments, the control system 100 may be configured to associate the asset identifier data with the sort location data corresponding to the sort location 400 at Block 712. At Block 713, the user 5 may continue transporting the asset 10 (and consequently the user device 110) to another sort location 400. The process may return to Block 701 and repeat the recited steps.

Referring again to Block 706, the process may proceed after comparing the sort location data and the appropriate sort location data for the asset 10 (illustrated as Block 705) with reference to Blocks 707-709 if the user 5 approaches the appropriate sort location. Additional details in this respect may be understood with reference to U.S. Ser. No. 15/390,109, the contents of which as are hereby incorporated by reference in their entirety.

The control system 100 may be further configured to generate one or more alerts regarding the association between the asset identifier data and the location data. The control system 100 may be configured to generate an alert to inform the user 5 (e.g., sort personnel) or other users regarding asset identifier data being associated with location data. Additional details in this respect may likewise be understood with reference to U.S. Ser. No. 15/390,109, the contents of which as are hereby incorporated by reference in their entirety.

VI. EXEMPLARY USE

Referring again to FIGS. 5, 10, and 15F collectively, shown therein are exemplary sort facilities in which assets 10 may be moved by a user 5 (e.g., sort personnel) from an intake location 450 (e.g., adjacent an acquisition device 115/410) via a conveying mechanism 402/802 to one of a plurality of sort locations 400.

As shown in FIG. 10 specifically, exemplary use of the system and architecture described herein may begin in certain embodiments with passing of one or more assets 10 through an acquisition zone 401 (see FIG. 5), which is adjacent to and/or surrounding an acquisition device 115/410. In this zone 401 the acquisition device 115 is configured, according to various embodiments to capture (e.g., image and/or scan) a combination of asset identifier data (e.g., shipping label data, tracking indicia, or the like) and conveyor belt data (e.g., an image of a set of uniquely patterned stripes surrounding the asset captured).

Once captured, the asset identifier data and the conveyor belt data (including the unique pattern of stripes surrounding the asset with which the identifier data is associated) is transmitted to the control system 100 for storage and correlation relative to one another. In certain embodiments this associated set of data may be periodically and/or proactively forwarded by the control system 100 to appropriate user devices 110; in other embodiments, the control system 100 may be configured to passively await receipt of conveyor belt data from at least one user device 110, at which point in time a match between the received conveyor belt data and that stored is conducted. Once matching occurs, the asset identifier data may be received/displayed at the user device 110.

Returning to FIG. 10 once more, it may be understood that downstream of the acquisition device 115 is a sorting zone (see also FIG. 5, zone 405). In this zone, following capture of data related to the assets by the acquisition device, a user 5 wearing or otherwise utilizing a user device 110 may approach the conveying mechanism 402/802 (e.g., a conveyor belt, slide, chute, bottle conveyor, open or enclosed track conveyor, I-beam conveyor, cleated conveyor, and/or the like) upon which the assets remain.

When adjacent or near the conveying mechanism 802, the user device 110 is configured to monitor, detect, and/or otherwise recognize the unique patterns of stripes on the conveying mechanism as the latter moves by. Via interactions with the control system 100 and/or the acquisition device 115, upon detection of a unique pattern, the user device 110 may—upon matching thereof with a stored unique pattern associated with obtained asset identifier data—generate for the user a visual indicator 810 (see also indicators 1001-1003 in FIGS. 15A-C) that, based upon the asset identifier data retrieved via association with the stored unique pattern, convey to the user 5 utilizing the user device 110 (for example, via a generated augmented reality environment projected via glasses worn by the user) sorting instructions for the assets approaching (or passing by) on the conveying mechanism 802.

Based upon the visual indicator 810 displayed, a user 5 may remove an asset 10 from an intake location (see also FIG. 5) and scan, read, or otherwise obtain (e.g., without direct scan, but only via information electronically communicated to the user device 110) asset identifier data from the asset 10. In one embodiment, the user device 110 may receive and store asset identifier data based at least in part on the information received from the asset indicia. In other embodiments, the user device 110 may receive and store asset identifier data only electronically, without any direct scan or imaging thereof by the user device (e.g., the user device 110 would only scan, monitor, and/or image the unique patterns of stripes 808 on the conveying mechanism 802. In any of these and still other embodiments, though, upon removal of the asset 10 from the intake location, the user 5 may then transport (e.g., carry) the asset 10 and the user device 110 away from the intake location 450 (and thus the conveying mechanism 402/802) and toward one of the plurality of sort locations 400. As the user 5 nears a sort location, the user device 110 may then receive sort location identifier data from one or more location devices 415, as described elsewhere herein and also described in additional detail in U.S. Ser. No. 15/390,109, the contents of which as are hereby incorporated by reference in their entirety.

Handling generally of the asset 10 by the user 5 at or near the sort locations 400 is likewise best understood with reference to U.S. Ser. No. 15/390,109, the contents of which as are hereby incorporated by reference in their entirety. In various embodiments, though, after depositing the asset 10 at a sort location 400, the user 5 may return to the intake location 450 with the user device 110 and begin the above described method for a second asset 10 to be sorted. Still further alternative and/or additional exemplary uses may be understood with reference to U.S. Ser. No. 15/390,109, the contents of which as are hereby incorporated by reference in their entirety.

VII. CONCLUSION

Many modifications and other embodiments of the inventions set forth herein will come to mind to one skilled in the art to which these inventions pertain having the benefit of the teachings presented in the foregoing descriptions and the associated drawings. For example, various embodiments may be configured to associate a plurality of assets with a particular sort location. In such embodiments, a sort employee may scan the improved conveyor belt to identify multiple patterns thereon associated with a plurality of asset identifiers (e.g., sequentially and/or simultaneously depending upon field of view) before transporting two or more of the plurality of items to a sort location (whether a single shared location or separate respective locations). Thereafter, the plurality of assets may be associated with the proximate sort location according to the features and methods described herein. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
a conveyor belt assembly comprising:
a conveyor mechanism comprising a plurality of stripes, each stripe, of the plurality of stripes including a respective visible surface of the conveyor mechanism, the plurality of stripes comprising a plurality of unique sets of stripes that are physically built in a non-repeating pattern, wherein the non-repeating pattern is readable by a user device to determine an identifier that identifies an asset on the non-repeating pattern.

2. The system of claim 1, wherein the non-repeating pattern is defined by at least seven unique colors, each stripe within the plurality of stripes comprising one of the at least seven unique colors.

3. The system of claim 1, wherein the plurality of unique sets of stripes within the plurality of stripes comprise unique sets of at least three distinct stripes located adjacent one another.

4. The system of claim 1, wherein the user device identifies the asset without scanning the asset based at least in part on recognizing at least a portion of the non-repeating pattern.

5. The system of claim 1, wherein the plurality of stripes include grayscale-based stripes.

6. The system of claim 1, wherein the plurality of stripes are rows that are oriented transverse relative to a direction of travel of the conveyor mechanism.

7. The system of claim 1, wherein the plurality of stripes extend continuously across an entire width of the conveyor mechanism.

8. The system of claim 1, wherein each stripe of the plurality of stripes has substantially a same width.

9. The system of claim 1, wherein at least two stripes, of the plurality of stripes, are made of different materials.

10. The system of claim 1, further comprising:
an acquisition device that is configured to capture image data of the asset travelling along a path of movement of the conveyor mechanism, the image data captured comprising asset identifier data and conveyor mechanism data, the conveyor mechanism data indicates one of the plurality of unique sets of stripes, the asset identifier data and the conveyor mechanism data being associated relative to one another and the asset; and
wherein the user device configured to generate at least one visual indicator of one or more sort instructions for the asset based at least in part on at least one of, the conveyor mechanism data or the asset identifier data.

11. A conveyor belt assembly comprising:
a conveyor mechanism having a primary axis oriented in a direction of travel and configured to define a path of movement of one or more assets to be placed upon the conveyor mechanism; and
a plurality of stripes coupled to the conveyor mechanism, each stripe, of the plurality of stripes, including a respective visible surface of the conveyor mechanism, the plurality of stripes including a first set of two or more stripes and a second set of two or more stripes, the first set of two or more stripes being consecutively positioned adjacent to one another, the second set of two or more stripes also being consecutively positioned adjacent to one another, the first set of two or more stripes defining a first pattern and the second set of two or more stripes defining a second pattern different than the first pattern such that the plurality of stripes includes a non-repeating pattern of sets of stripes.

12. The conveyor belt assembly of claim 11, wherein the non-repeating pattern is defined by at least seven unique colors, each stripe within the plurality of stripes comprising one of the at least seven unique colors.

13. The conveyor belt assembly of claim 11, wherein first set of two or more stripes comprise unique sets of at least three distinct stripes located adjacent one another.

14. The conveyor belt assembly of claim 11, further comprising an asset disposed over a portion of the plurality of stripes, wherein a user device determines instructions for where to place the asset without scanning the asset based at least in part on recognizing the portion.

15. The conveyor belt assembly of claim 11, wherein the plurality of stripes include grayscale-based stripes.

16. The conveyor belt assembly of claim 11, wherein the plurality of stripes are rows that are oriented transverse relative to the direction of travel of the conveyor mechanism.

17. The conveyor belt assembly of claim 11, wherein the plurality of stripes extend continuously across an entire width of the conveyor mechanism.

18. The conveyor belt assembly of claim 11, wherein each stripe of the plurality of stripes has substantially a same width.

19. The conveyor belt assembly of claim 11, wherein at least two stripes, of the plurality of stripes, are made of different materials.

20. The conveyor belt assembly of claim 11, further comprising:
   an acquisition device that is configured to capture image data of an asset travelling along the path of movement of the one or more assets, the image data captured comprising asset identifier data and conveyor mechanism data, the conveyor mechanism data indicating one of the plurality of stripes, the asset identifier data and the conveyor mechanism data being associated relative to one another and the one or more assets.

* * * * *